United States Patent [19]
Morita et al.

[11] Patent Number: 5,283,788
[45] Date of Patent: Feb. 1, 1994

[54] ISDN D CHANNEL CONGESTION CONTROL METHOD

[75] Inventors: Sumie Morita, Yokohama; Takashi Hatano, Machida; Masako Shinmura, Hamamatsu; Hisashi Koga; Tsutomu Shiomitsu, both of Yokohama, all of Japan

[73] Assignee: Fujitsu Limited, Kawasaki, Japan

[21] Appl. No.: 757,328

[22] Filed: Sep. 10, 1991

[30] Foreign Application Priority Data

Sep. 10, 1990 [JP] Japan .................................. 2-237230

[51] Int. Cl.$^5$ .............................................. H04J 3/14
[52] U.S. Cl. .................................. 370/110.1; 370/60; 379/111; 379/134; 379/140
[58] Field of Search ............... 370/60, 110.1; 379/111, 379/134, 140

[56] References Cited

U.S. PATENT DOCUMENTS

| | | |
|---|---|---|
| 4,845,710 | 7/1989 | Nakamura et al. ............. 370/110.1 |
| 4,965,795 | 10/1990 | Coffelt et al. ..................... 370/110.1 |

FOREIGN PATENT DOCUMENTS

0329159A3  8/1989  European Pat. Off. ...... H04L 11/20

OTHER PUBLICATIONS

Comer et al., "A Rate-based Congestion Avoidance and Control Scheme for Packet Switched Networks", *Proceedings, 10th International Conference on Distributed Computer Systems,* pp. 390–397, May 1990.

Falek et al., "Standards Makers Cementing ISDN Subnetwork Layers" *Data Communications,* pp. 236–255, vol. 16, No. 11, Oct. 1987.

Robinson, et al., "Congestion Control in BBN Packet-switched Networks", *Computer Communications Review,* pp. 76–90, vol. 20, No. 1, Jan. 1990.

European Search Report, The Hague, search completed Jan. 29, 1993.

*Primary Examiner*—Douglas W. Olms
*Assistant Examiner*—Russell W. Blum
*Attorney, Agent, or Firm*—Staas & Halsey

[57] ABSTRACT

An ISDN D channel congestion control method has at least either a digital subscriber line circuit common (DLCC) or a signaling controller (SGC) notify either an SGC or a packet subscriber system (PSS) of a D channel congestion according to a predetermined protocol, thereby controlling the congestion of a communication controlling apparatus.

9 Claims, 30 Drawing Sheets

| CONGESTION POINT | SAPi | TEi | C | I FIELD | | SEQ No. | DIREC-TION |
|---|---|---|---|---|---|---|---|
| | | | | PI | ADDED INFORMATION | | |
| ⑦ DETECTION | 31 | 0 | 03 | 0100 | SHELF No. | n | → |
| | | | | 8100 | SHELF No. | n | ← |
| ⑦ RELEASE | 31 | 0 | 03 | 0101 | SHELF No. | n | → |
| | | | | 8101 | SHELF No. | n | ← |
| ⑧ DETECTION | 31 | 0 | 03 | 0102 | SHELF No. | n | → |
| | | | | 8102 | SHELF No. | n | ← |
| ⑧ RELEASE | 31 | 0 | 03 | 0103 | SHELF No. | n | → |
| | | | | 8103 | SHELF No. | n | ← |
| ⑨ DETECTION | 31 | 0 | 03 | 0104 | — | n | → |
| | | | | 8104 | — | n | ← |
| ⑨ RELEASE | 31 | 0 | 03 | 0105 | — | n | → |
| | | | | 8105 | — | n | ← |
| ⑩ DETECTION | 31 | 0 | 03 | 0106 | — | n | → |
| | | | | 8106 | — | n | ← |
| ⑩ RELEASE | 31 | 0 | 03 | 0107 | — | n | → |
| | | | | 8107 | — | n | ← |
| INQUIRY FROM P | 31 | 0 | 03 | 8109 | — | * | ← |
| | | | | 0109 | — | * | → |
| INQUIRY FROM D | 31 | 0 | 03 | 8108 | SHELF No. | * | ← |
| | | | | 0108 | SHELF No. | * | → |

→ : SGC → PSS
← : PSS → SGC

Fig. 10

ISDN D CHANNEL CONGESTION CONTROL METHOD

BACKGROUND OF THE INVENTION

This invention pertains to a digital switching apparatus for use in an ISDN office, and more particularly to a D channel congestion control system for controlling the congestion of the D channel in an ISDN (Integrated Services Digital Network) environment.

DESCRIPTION OF THE RELATED ART

A FETEX-150 (manufactured by Fujitsu Limited) is a digital switching apparatus for an ISDN office, and satisfies the advisory standards adopted by the CCITT. The FETEX-150 performs D channel ISDN packet services.

FIG. 1 shows the system configuration of a prior art system.

An MPX (multiplexer/demultiplexer) 1-3 is connected through SLCs (subscriber line circuits) 1-1 and 1-2 in an SLCSH (subscriber line circuit shelf) 1 with analog subscriber lines. The MPX 1-3 outputs an SCN/SD (scanner/signal distributor) signal, which scans the SLCs 1-1 and 1-2. An LSW (line switch) 2 receives the signal selected by the scanning. The SLCSH 1 outputs a signal supplied from another apparatus to a target subscriber line in the opposite direction.

DLCs (digital subscriber line circuits) 3-1 and 3-2 in a DLCSH (digital subscriber line circuit Shelf) 3 are connected with a basic access with 2B-D channels for respective lines. The DLCs 3-1 and 3-2 split the 2B+D channels into 2B channels and a D channel, and connect the D channel to a DLCC (digital subscriber line circuit common) 3-4 and the 2B channels to an MPX 3-3. The DLCC 3-4 is also connected to the MPX 3-3. The MPX 3-3 is connected to the LSW 2.

The LSW 2 is connected additionally to an NWIF (network interface) 4, an SGC (signaling controller) 5, an LPR (line processor) 6 and a DTSH (digital terminal shelf) 3'.

The SGC 5 is a circuit for controlling signals. The LPR 6 is a processor for controlling the states according to the P information and S information of the D channel supplied through the SGC 5.

The NWIF 4 is a circuit for the LSW 2 interfacing other apparatuses and is connected to a PSS (Packet Subscriber System), a DSM (Digital Switching Module) and a CPR (Call Processor).

The LSW 2 switches the D channel signal described earlier which is supplied from the DLCC 3 4 through the MPX 3-3, and supplies it to the PSS, SGC and LPR. The P information and S information of the D channel, which are control information of each basic access with 2B+D channels, are supplied to the LPR 6 through the SGC 5 and to the PSS through the NWIF 4, according to the switched D channel information. Transmission of the D channel information causes the 2B signal to be transmitted e.g. to a target terminal.

Although D channel packet concentration paths differ with the scale of an ISDN, D channel packet data cause a second layer of an LAPD (linked layer access procedure D channel) to terminate a PLCA (packet line controller access) of a terminal PSS regardless of the scale of an ISDN. For example, too many requests from terminals necessarily cause buffers in respective circuits to have a capacity overflow.

Therefore, a congestion control is essential for packet communications. The CCITT advises a congestion control by an LAPD protocol. For instance, the earlier described PLCA of a terminal PSS has the second layer of the LAPD to perform a communication congestion control.

As described earlier, the FETEX-150 has the PLCA of the PSS terminating the LAPD to perform a congestion control based on the advisory standards adopted by the CCITT. However, the SGC 5 and the DLCC 3-4 of a D channel packet relaying apparatus cannot perform a congestion control for the lack of such a protocol.

Conventionally, a 2B packet performs not only the PLCA congestion control but also a congestion control between the terminal PSS and the PLCA. Since the DLCC 3-4 and the SGC 5 perform a D channel packet concentration, they can experience a congestion and a congestion control is desirable.

Because the FETEX-150 realizes the concentration processing and the LAPD processing for the call control information in a mixed form, a D channel congestion adversely affects a call control information processing. That is, a congestion of a D channel packet, which is control information, causes an abnormal state due to lack of its control information.

SUMMARY OF THE INVENTION

This invention pertains to a D channel congestion control system for controlling the congestion of the D channel in an ISDN environment.

This invention has an object of having a digital subscriber line circuit common and/or a signaling controller detect a D channel packet data congestion and of providing an ISDN D channel congestion control system for controlling the congestion in D channel packet communications.

This invention configures an ISDN D channel congestion control method to have at least either a digital subscriber line circuit common (DLCC) or a signaling controller (SGC) notify either an SGC or a packet subscriber system (PSS) of a D channel congestion according to a predetermined protocol, thereby controlling the congestion of a communication controlling apparatus.

When the digital subscriber line circuit common of a digital switching apparatus in an ISDN office has a first buffer to store D channel P information concentrated by the signaling controller and supplies the D channel P information to plural terminals through second buffers each connected to the corresponding one of the plural terminals, capacity overflows of the second buffers caused by an information volume in excess of a threshold are detected for discarding the excess volume of the D channel P information, and a simplified linked layer access procedure D channel protocol notifies the packet line controller access of the discarding.

BRIEF DESCRIPTION OF THE DRAWINGS

FIG. 10 shows a format of a UI frame; and

DESCRIPTION OF THE PREFERRED EMBODIMENT

Figure 1:
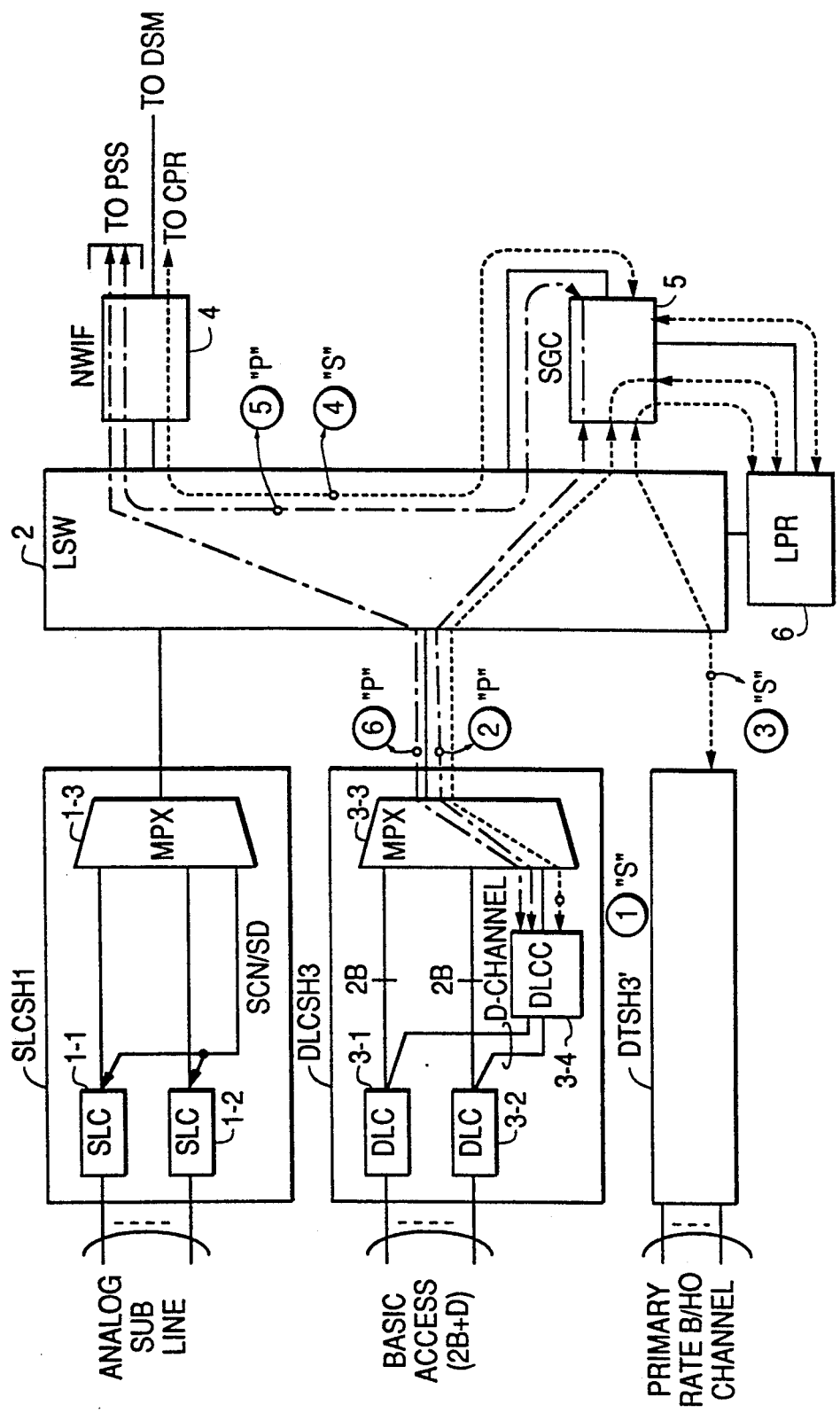
FIG. 1 shows the system configuration of a prior art.

This invention enables a congestion control reflecting a congestion at a relaying apparatus to an end-to-end LAPD (linked layer access procedure D channel) protocol by setting a proprietary communication protocol between a relaying apparatus and a PLCA (packet line controller access) in the SGC (signaling controller) and/or DLCC (digital subscriber line circuit common) of a digital switching apparatus in an ISDN office.

For instance, when the DLCC has its first buffer store D channel P information concentrated by the SGC and supplies the D channel P information to plural terminals through second buffers each connected to the corresponding one of the plural terminals, capacity overflows of the second buffers caused by an information volume in excess of several times of the capacity of a window size terminal are detected for discarding the excess volume of the D channel P information, and a simplified LAPD protocol notifies the PLCA of the discarding. The notification by the simplified LAPD protocol to the PLCA enables a congestion control for the second buffers in the DLCC through an appropriate judgment.

D channel S information is reset according to the detection of particular information values stored in the buffers for respective terminals in excess of a predetermined value.

Further, when a receiving buffer stores the D channel P information concentrated by the SGC, a congestion control is performed according to the usage rate of the receiving buffer and the simplified LAPD protocol notifies the PLCA in a PSS (Packet Subscriber System) of the congestion control, thereby having the LAPD in the PLCA regulate the D channel P information.

In addition, when the receiving buffer stores the D channel P information concentrated by the SGC, a congestion control is performed according to the usage rate of the receiving buffer, thereby causing transmission of an RNR (Receive Not Ready) signal to the SGC regulate the D channel P information.

The SGC monitors the usage rate of the receiving buffer for receiving P information supplied from the DLCC. The SGC sets 16 to an SAP (service access point) of the PLCA of the PSS and emits the RNR signal to a terminal over the LAPD, when the usage rate of the receiving buffer exceeds a first usage rate threshold. The SGC discards the P information when the usage rate of the receiving buffer exceeds a second usage rate threshold. The SGC also detects the congestion of the S information supplied from the DLCC and emits the RNR signal to the DLCC to notify the DLCC of an LPR (line processor) congestion.

The SGC monitors the usage rate of a sending buffer storing P information to be emitted to the DLCC. The SGC regulates the transmission of an I frame having the corresponding DLCC shelf number at the PLCA in the PSS through a primary congestion notification when the usage rate of the sending buffer exceeds a first usage rate threshold. The SGC discards the P information after making a secondary congestion notification when the usage rate of the sending buffer exceeds the second usage rate threshold.

The SGC also detects the usage rate of a buffer storing S information. When the usage rate is equal to or greater than a first usage rate threshold, the SGC regulates the reception by the LPR after making a primary congestion notification. When the usage rate is equal to or greater than a second usage rate threshold, the SGC compulsorily releases the LPR after making a secondary congestion notification.

The SGC monitors the usage rates of receiving buffers for respective lines concentrating D channels. When one of the usage rates reaches a first usage rate threshold, the PLCA in the PSS restrains the transmission of all I frames from the corresponding line after making a primary congestion notification. When one of the usage rates reaches a second usage rate threshold, the SGC discards the excess information after making a secondary congestion notification.

The SGC monitors the usage rates of receiving buffers for respective lines concentrating D channels. When one of the usage rates reaches a first usage rate threshold, the LAPDs of all shelves emit the RNR signal after notifying the PLCA in the PSS. When one of the usage rates reaches a second usage rate threshold, the SGC discards the excess information after notifying a PPR.

A first usage rate threshold is set e.g. to 80%, while a second usage rate threshold is set e.g. to 100%. If the congestion is anticipated to take place at a usage rate less than 100%, a primary congestion notification is made when the usage rate reaches 80%, and a secondary congestion notification is made when the usage rate reaches 100%, thereby performing an appropriate congestion control, depending on the situation.

Figure 2:
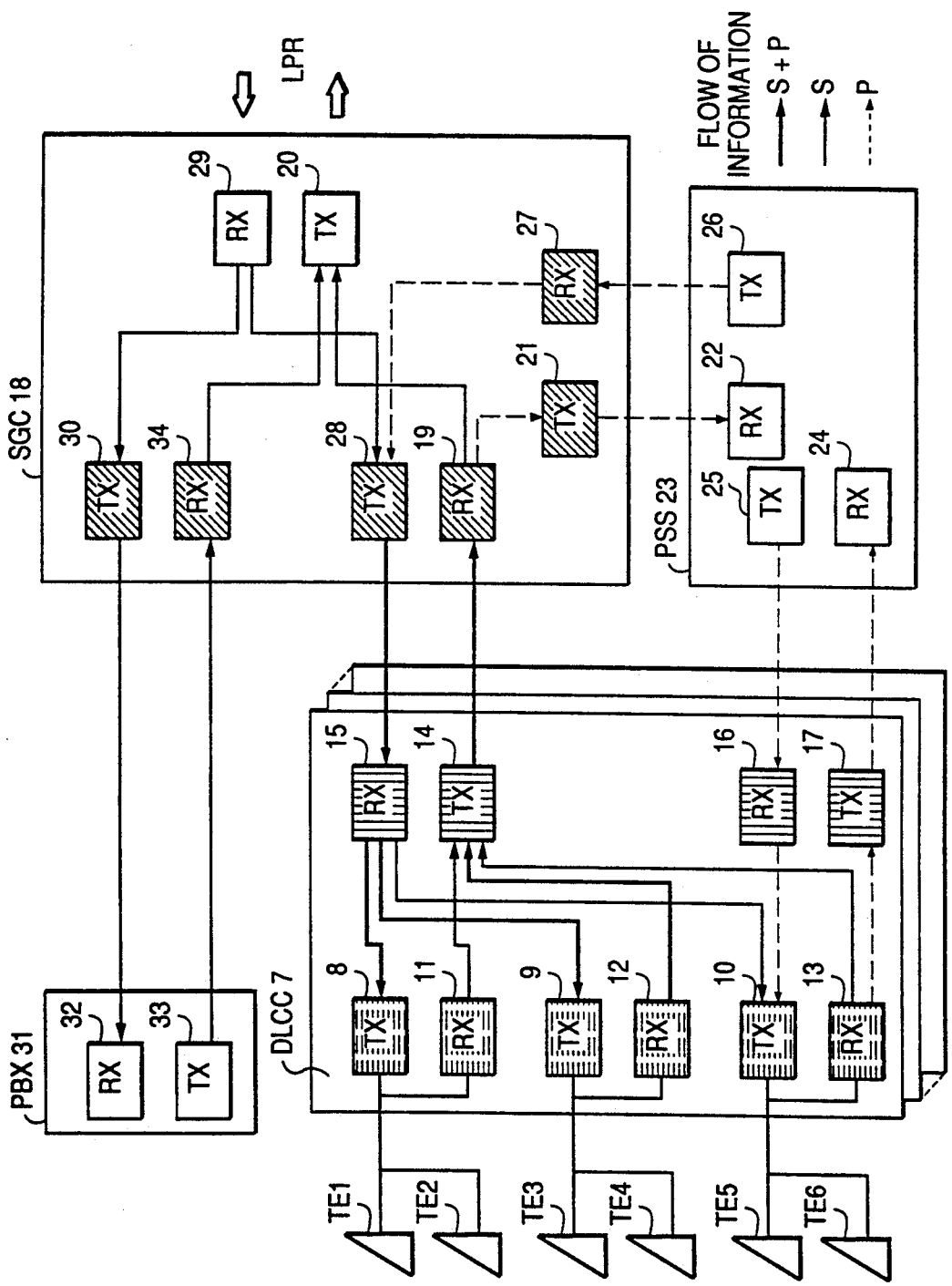
FIG. 2 shows the configuration of a line concentration.

A more detailed explanation of this invention is given as follows in association with the drawings:

FIG. 2 shows the configuration of an embodiment of this invention. The configuration shown in FIG. 2 does not illustrate the LSW 2, the LPR 6, the NWIF 4, the DTSH 3', etc. shown in FIG. 1, to emphasize the explanation of the congestion in the DLCC 3-4 and the SGC 5, and to concentrate on the description of the transmission of necessary D channel packets.

Terminals TE1 through TE6 connect receiving buffers RX11, RX12 and RX13 to sending buffers TX8, TX9 and TX10 in the DLCC 7. That is, terminals TE1 and TE2 are connected to sending buffer TX8 and receiving buffer RX11. Terminals TE3 and TE4 are connected to sending buffer TX9 and receiving buffer RX12, while terminals TE5 and TE6 are connected to sending buffer TX10 and receiving buffer RX13. The receiving buffers RX11, RX12, and RX13 are buffers for receiving data from a D channel, where packets received from the D channel, that is, the P and S information are stored after being collected in an sending buffer TX14 in the DLCC 7. The stored information is transmitted to a receiving buffer RX19 in the SGC 18. The S information and the P information are supplied to sending buffer TX14 by receiving buffers RX11 and RX12, and the S information is supplied to sending buffer TX14 by receiving buffer RX13.

When the above described information is transmitted and supplied to receiving buffer RX19 in the SGC 18, the S information is supplied to an sending buffer TX20 to be outputted to the LPR, while the P information is supplied to an sending buffer TX21 to be emitted to the PSS 23. Sending buffer TX20 stores the S information and supplies it to the LPR. Then, the P information stored in a sending buffer TX21 is supplied to a receiving buffer RX22 in the PSS 23. That is, the S information provided by terminals TE1 through TE6 is outputted to the LPR through receiving buffers RX11, RX12, and RX13, sending buffer TX14, receiving buffer RX19 and sending buffer TX20 in the SGC 18. The P information provided by terminals TE1 through TE4 is supplied to receiving buffer RX22 in the PSS 23 through receiving buffers RX11 and RX12, sending buffer TX14, receiving buffer RX19, and sending buffer TX21 in the SGC 18. The P information provided by terminals TE5 and TE6 is stored in the sending buffer TX17 through receiving buffer RX13. Then, the stored P information is transmitted to receiving buffer RX24 in the PSS 23.

According to the above described data flow, the S information of the terminal in the D channel is transmitted to the LPR, while the P information is transmitted to the PSS 23. The information enables the PLCA, etc. in the PSS 23 to perform communications in respective layers.

On the other hand, the P information stored in the D channel to be transmitted from the PSS 23 to terminals TE5 and TE6 is stored temporarily in receiving buffer RX16 in the DLCC 7 through sending buffer TX25, and then supplied to terminals TE5 and TE6 through sending buffer TX10. The P information to be transmitted to terminals TE1 through TE4 is supplied from sending buffer TX26 in the PSS 23 to sending buffer TX28 through receiving buffer RX27 in the SGC18; then supplied from sending buffer TX28 to terminals TE1 through TE4 through receiving buffer RX15 and sending buffers TX8 and TX9 in the DLCC 7. The S information generated by the LPR is supplied to sending buffer TX28 through receiving buffer RX29 in the SGC 18, and then supplied to terminals TE1 through TE4 in a flow similar to that of the P information.

If a PBX is connected through the DTSH 3', the S information is supplied from the LPR to a receiving buffer RX32 in a PBX 31 through an sending buffer TX30 in the SGC18. The S information generated in the PBX31 is supplied to a receiving buffer RX34 in the SGC18 through an sending buffer TX33, and then transmitted to the LPR through sending buffer TX20.

The following cases of congestion can take place in respective buffers (corresponding to the buffers indicated in FIG. 2) during the above described data transmission:

case 1: a receiving buffer connected to a subscriber line interface (RX11, RX12, RX13)
case 2: a sending buffer connected to a subscriber line interface (TX8, TX9, TX10)
case 3: a receiving buffer connected to a superordinate apparatus interface (LPR circuit) (RX15)
case 4: an sending buffer connected to a superordinate apparatus interface (LPR circuit) (TX14)
case 5: a receiving buffer connected to a superordinate apparatus interface (PPR circuit) (RX16)
case 6: a n sending buffer connected to a superordinate apparatus interface (PPR circuit) (TX17)

The above described cases 1 through 6 correspond to the indicated buffers shown in FIG. 2. When these buffers experience a congestion, receiving buffers RX12 and RX13 connected to the subscriber line interface transmits the RNR (receive not ready) signal to a terminal when the usage rate of a receiving buffer for S information or P information reaches 80%.

In principle, sending buffers TX8, TX9, and TX10 on the subscriber line interface side cannot have P information value exceeding the product value of [window size K] and [number of active terminals (TE NO.)]. The product value $[K \times (TE\ NO.)]$ is defined as a threshold, and a packet frame exceeding the threshold is discarded. Each link, that is, each of the terminals TE1 through TE6 controls the S information. When S information exceeds a predetermined threshold in a terminal, the corresponding terminal recognizes the congestion and the corresponding link is reset.

The congestion of receiving buffer RX15 on a superordinate apparatus interface (LPR concentration) is basically controlled according to the usage rate of a receiving buffer. Since receiving buffer RX15 is used for storing both S and P information, "busy state" thresholds are set for the S and P information respectively. When the S or P information exceeds a "busy state" threshold, the transmission of the excess S or P information is regulated.

That is, the data transmission is regulated in the LAPD in the PLCA 48 after the congestion notification is issued to the PLCA 48 in the PSS 23. Then, the notification is given to the PPR for printing it out.

The S information is regulated by sending the RNR signal to the SGC 18. If the P information is not regulated yet then, the PPR is notified of the congestion. The congestion notification is also given to the PLCA 48 in the PSS 23 as in the regulation of the P information, and the S information is regulated by the LAPD in the PLCA 48. After sending the RNR signal to the SGC 18, the DLCC 7 restarts a DLCC-phase-B process through a self-resetting function, unless the RNR signal is cleared after elapsing a predetermined period.

If sending buffer TX14 of a superordinate apparatus interface (LPR concentration) experiences a congestion of the concentration, sending buffer TX14 notifies the PLCA 48 of the congestion and sends the RNR signal to the terminal, thereby regulating the transmission of the P information. Sending buffer TX14 does not regulate the S information, because receiving buffer RX11 later controls the congestion.

Receiving buffer RX16 of a superordinate apparatus interface (PPR concentration) operates similarly to receiving buffer RX15, and the LAPD in the PLCA 48 regulates the congestion according to the usage rate of receiving buffer RX16. "Busy state" thresholds are determined respectively for the S and P information, and receiving buffer RX16 notifies the PLCA 48 in the PSS 23 of the congestion.

Sending buffer TX17 of a superordinate apparatus interface (PPR circuit) operates similarly to sending buffer TX14 of the SGC concentration. Sending buffer TX17 notifies the PLCA 48 of the congestion and sends the RNR signal to the corresponding terminals, thereby regulating the P information between terminals, when the concentration is busy.

Sending buffers TX8, TX9, TX10, TX14 and TX17, as well as receiving buffers RX11, RX12, RX13, RX15 and RX16 respectively have a detecting means and a notifying means for detecting and notifying the congestion, and control the congestion in the DLCC 7, according to the above described operation.

The following cases of congestion take place in respective buffers (corresponding to the buffers indicates in FIG. 2) during the above described data transmission:
case 7: receiving buffer RX19 connected to the DLCC interface
case 8: sending buffer TX28 connected to the DLCC interface
case 9: receiving buffer RX27 connected to the PSS interface
case 10: sending buffer TX21 connected to the PSS interface
case 11: receiving buffer RX30 connected to the PRI interface
case 12: sending buffer TX34 connected to the PRI interface The above, described cases 7 through 12 correspond to the indicated buffers shown in FIG. 2.

Receiving buffer RX19 interfacing the DLCC 7 monitors the usage rate of P information in the SGC 18 and notifies the PPR in two (2) stages and has the PLCA 48 in the PSS 23 regulate the P information. The congestion notification is issued to the PPR in two (2) stages in association with the DLCC shelf numbers. For example, the primary congestion notification is made at the usage rate of 80%, and assuming SAP=16, the RNR signal is sent over the LAPD to a terminal. After the secondary congestion notification is issued at the usage rate of 100%, the SGC 18 discards excess information, and the PPR prints out a message indicating the congestion.

When receiving buffer RX19 interfacing the DLCC 7 experiences a congestion of S information in spite of the regulation of the S information, the RNR signal is sent to the DLCC 7 as the congestion in the LPR. If there is no congestion of the P information, the PPR is notified to print out a message indicating the congestion of the DLCC bus. If the RNR signal is sent out repeatedly, a congestion arises in the above described sending buffer TX14, deriving the congestions in receiving buffers RX11, RX12 and RX13 connected to all subscribers. The congestions in these receiving buffers RX11, RX12 and RX13 cause the RNR signal to be sent to all terminals, and the call controlling operation starts for all sixty-four (64) subscribers in the DLCC 7.

The SGC 18 regulates the congestion of the P information in sending buffer TX28 interfacing the DLCC 7 by monitoring the usage rate of sending buffer TX28 for the P information, notifying the PPR of the congestion in two (2) stages, and regulating the transmission of I frames of the corresponding DLCC shelf number in the PLCA 48 in the PSS 23 in association with DLCC shelf numbers. After the secondary congestion notification is issued at the usage rate of 100%, the SGC 18 discards excess information, when the PPR prints out a message indicating the congestion.

If a congestion arises in sending buffer TX28 in spite of the regulating the S information in the DLCC 7 in association with each LAPD, the LAPD in the SGC 18 monitors the S information and notifies the LPR of the two-stage congestion notification involving all of sixty-four (64) subscribers in the DLCC 7, and the LPR regulates the congestion. For example, at the 80% usage rate of sending buffer TX28, the SGC 18 notifies the LPR of the primary congestion, and the LPR regulates the reception of the S information; while at the usage rate of 100%, the SGC18 notifies the LPR of the secondary congestion and compulsorily releases the LPR. If a time-out monitoring does not clear the congestion after the secondary congestion notification, the corresponding link is reset.

The PLCA 48 in the PSS 23 regulates the congestion by monitoring in each line of the D channel concentration the usage rate of receiving buffer RX27 interfacing the PSS 23, issuing the two-stage congestion notification in association with the ports of the D channel circuit. For example, the PLCA 48 in the PSS 23 issues the primary congestion notification at the usage rate of 80%, and regulates the transmission of all I frames of the corresponding code. Then, after the secondary congestion notification is issued at the usage rate of 100%, the SGC 18 discards excessive information, when the PPR prints out a message indicating the congestion.

The PLCA 48 in the PSS 23 regulates the congestion in sending buffer TX21 connected to the PSS interface by monitoring in each line of the D channel circuit the usage rate of the sending buffer TX21, and issuing the secondary congestion notification to the PPR. For example, at the usage rate of 80%, the PLCA 48 in the PSS 23 is notified of the congestion to send the RNR signal from the LAPD of all shelf numbers; and at the usage rate of 100%, the PPR receives the secondary congestion notification, and the SGC discards the excessive information after the PPR prints out a message indicating the congestion.

The SGC/LAPD regulates the congestion in receiving buffer RX34 connected to the PRI interface by monitoring in each line the usage rate of the receiving buffer, sending the RNR signal at the usage rate of 80%, and releasing the RNR signal at the usage rate of 40%.

The SGC/LAPD regulates the congestion in sending buffer TX30 connected to the PRI interface by monitoring in each line the usage rate of the sending buffer, and issuing the secondary congestion notification to the LPR. For example, the LPR regulates the reception according to the primary congestion notification at the usage rate of 80%, and makes forced release according to the secondary congestion notification at the usage rate of 100%. The corresponding link is reset unless the congestion is released after the timer indicates the time-out following the secondary congestion notification.

The communication between the above described SGC and PSS is conducted using UI frames of a specific SAP (SAP=31). That is, a program for processing messages is provided for the SGC 18 and PLCA 48 in the PSS 23 respectively.

The congestion in each buffer is detected according to the above described procedure to control the congestion.

Figure 3:
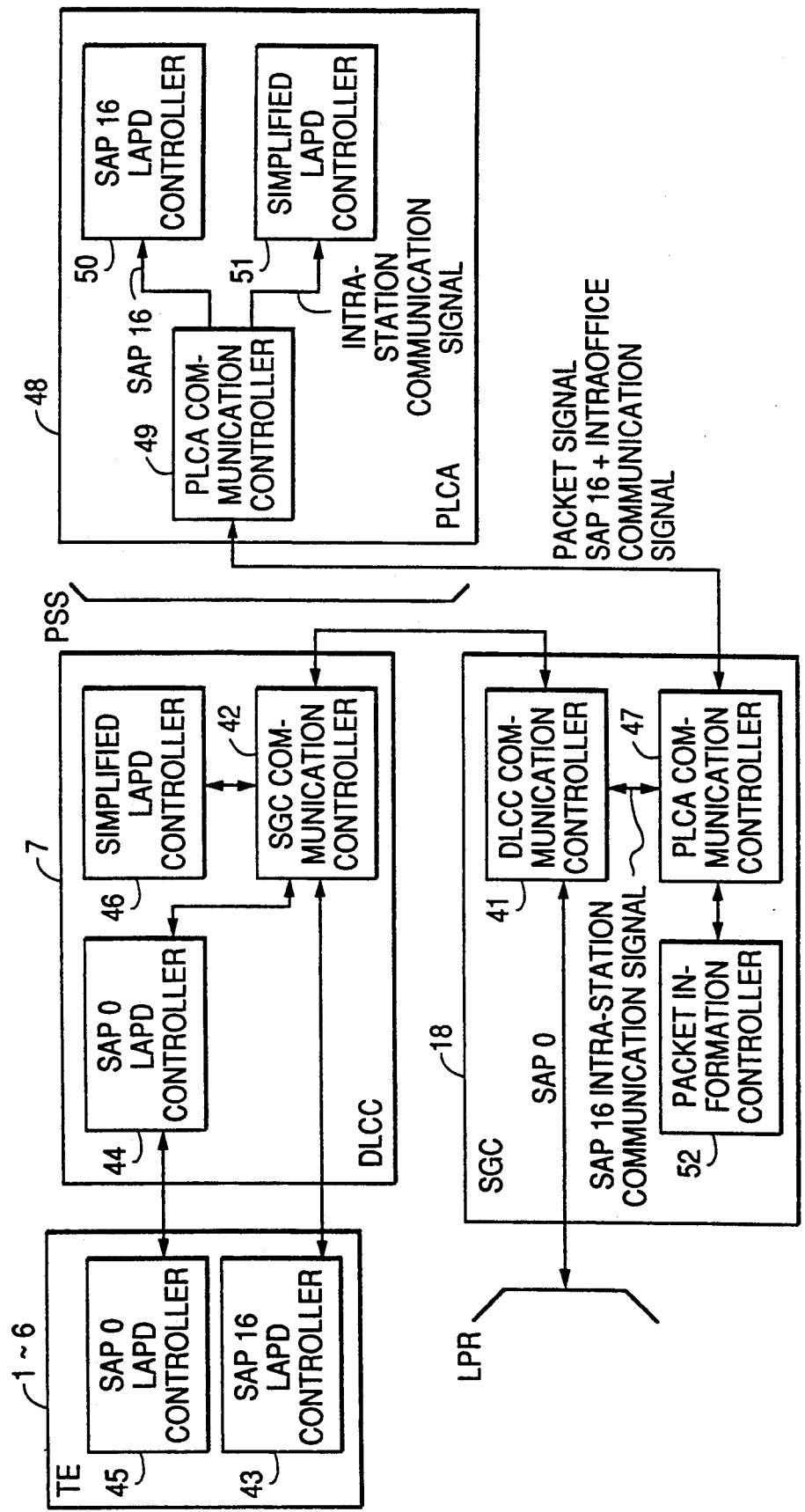
FIG. 3 shows a communication configuration during a congestion according to an embodiment of this invention.

FIG. 3 shows the configuration of an embodiment of this invention for controlling a congestion in communications.

The DLCC 7 and the SGC 18, which are relay units, conduct intraoffice communications with the PLCA 48 in the PSS 23 through a simplified LAPD protocol (an SAP number, SAPI, yet to be defined by a CCITT advice). In addition to monitoring the communication path, the DLCC 7 and the SGC 18 secure the notification procedure for having the DLCC 7 notify the PLCA 48 in the PSS23 of information such as on processing subscriber line fault recovery, controlling a first layer of a subscriber line, assigning the terminals TE1 through TE6, controlling a congestion, etc. Since a transmission between the SGC 18 and the PSS 23 is within a transmission between the DLCC 7 and the PLCA 48, a further simplified LAPD protocol is adopted. For example, only necessary frames are notified using different SAPIs and unnumbered frames (UI) having little affection on the LAPD communication between the DLCC 7 and the PLCA 48.

The intraoffice communications, etc. are explained below in further detail.

The terminals TE1 through TE6 respectively comprise an SAP0 LAPD controller 45 and an SAP16 LAPD controller 43. The DLCC 7 comprises an SAP0 LAPD controller 44, a simplified LAPD controller 46, and an SGC communication controller 42. The SGC 18 comprises a DLCC communication controller 41, a packet information controller 52, and a PLCA communication controller 47. The PLCA 48 in the PSS 23 comprises a PLCA communication controller 49, a SAP16 LAPD controller 50, and a simplified LAPD controller 51.

PLCA communication controller 47 of the SGC 18 and PLCA communication controller 49 of the PLCA 48 connected to each other perform inter-PLCA communications by using packet signals and SAP16 +intraoffice communication signals.

The DLCC communication controller 41 in the SGC 18 and the SGC communication controller 42 in the DLCC 7 connected to each other control the intraoffice communication.

The SAP0 LAPD controllers 45 in the terminals TE1 through TE6 are connected to the SGC communication controller 42 by way of the SAP0 LAPD controller 44 in the DLCC7. The SAP0 LAPD controller 45 and the LPR communicate through the path SAP0 LAPD controller 44—the SGC communication controller 42—the DLCC communication controller 41 by using the SAP0.

The SAP16 LAPD controller 43 in one of the terminals TE1 through TE6 communicates with the SAP16 LAPD controller 50 of the PLCA 48 in the PSS 23 by way of the SGC communication controller 42, the DLCC communication controlle 41 , and the PLCA communication controllers 47 and 49, by using SAP16.

Similarly, the simplified LAPD controller 46 in the DLCC 7 communicates with the simplified LAPD controller 51 by way of the SGC communication controller 42, the DLCC communication controller 41, the PLCA communication controllers 47 and 49, by using the simplified LAPD protocol.

The PLCA communication controller 47 connected to the packet information controller 52 communicates with the PLCA 48 by having the packet information controller 52 in the SGC 18 control packets supplied from the PLCA 48.

The congestion in the interface of each buffer can be controlled completely by transmitting the information of the state of each buffer in congestion.

The above described procedure enables the congestions in respective apparatuses, i.e. all receiving buffers in the relay units, i.e. the DLCC 7 and the SGC 18, to be detected, the congestion control information to be transmitted as an intraoffice communication between the relay units and the PLCA 48 in the PSS 23 by using a simplified LAPD protocol and the like. The communications enable not only the congestions of buffers in respective office apparatuses to be appropriately controlled but also the congestions of D channels to be newly controlled.

Figure 4:
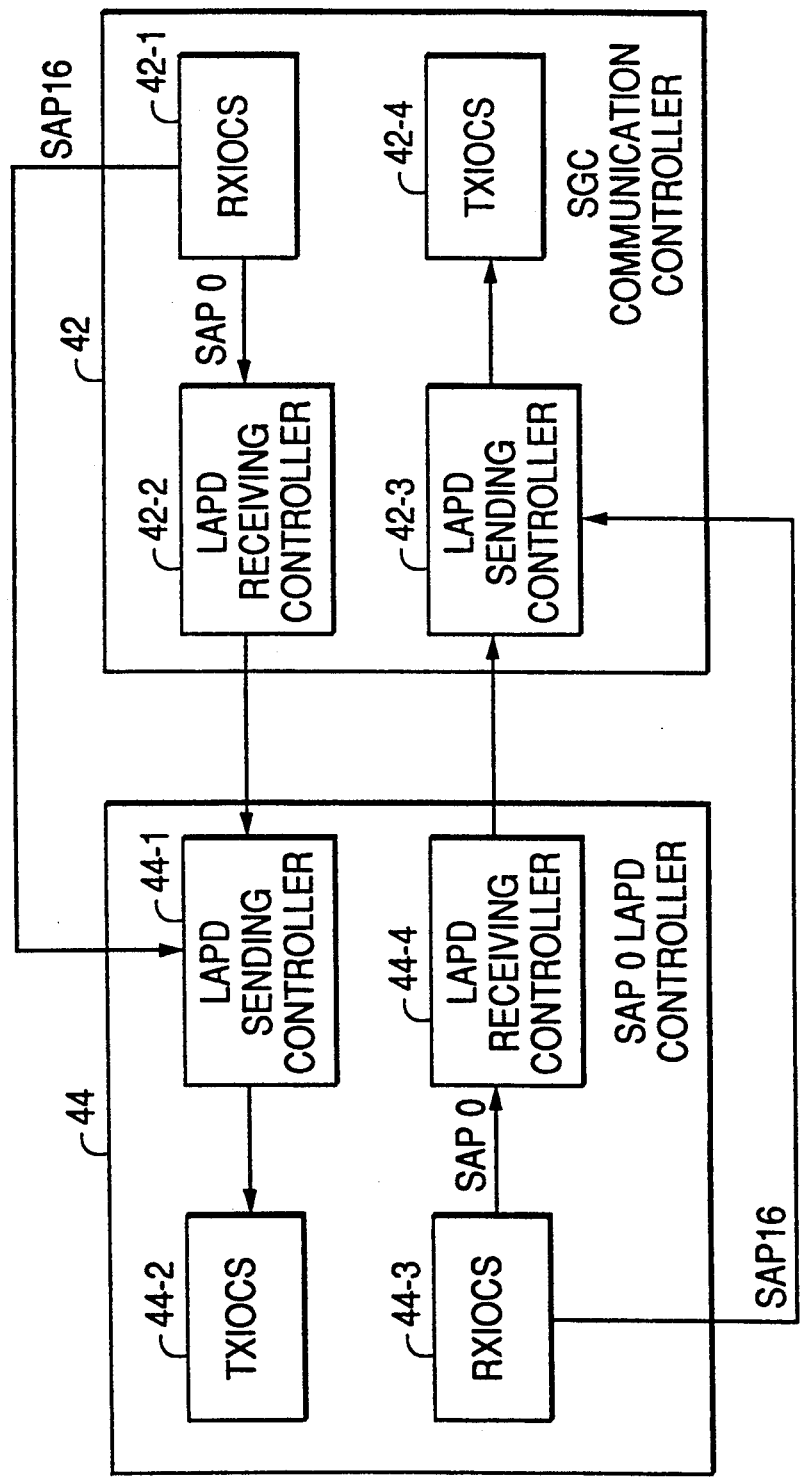
FIG. 4 shows a module configuration in a digital subscriber line circuit common (DLCC)

FIG. 4 shows a module configuration in the DLCC 7.

More specifically, FIG. 4 shows in detail an SAP0 LAPD controller 44 and an SGC communication controller 42. As with the SGC communication controller 42 comprising a LAPD transmission controller 44-1, a TXIOCS 44-2, an RXIOCS 44-3 and an LAPD reception controller 44-4, the SAP0 LAPD controller 44 comprises an RXIOCS 42 1, an LAPD reception controller 42-2, an LAPD transmission controller 42-3 and a TXIOCS 42-4.

The SGC communication controller 42 and the SAP0 LAPD controller 44 process a frame to a terminal. RXIOCS 42-1 in the SGC communication controller 42 governs an LAPD frame reception during a communication with the SGC 18. RXIOCS 42-1 transmits its received LAPD frame to LAPD transmission controller 44-1 through LAPD reception controller 44-2 on receiving an SAP0 frame. The RXIOCS 42-2 transmits its received LAPD frame directly to LAPD transmission controller 44-1 on receiving an SAP16 frame. TXIOCS 44-2 emits the LAPD frame to a terminal.

The SGC communication controller 42 and the SAP0 LAPD controller 44 similarly process a frame from a terminal. RXIOCS 44-3 transmits an SAP0 frame from a terminal to the SGC 18 through LAPD reception controller 44-4, LAPD transmission controller 42-3 and TXIOCS 42-4. RXIOCS 44-3 transmits an SAP16 frame from a terminal to the SGC 18 through LAPD transmission controller 42-3 and TXIOCS 42-4.

Figure 5:
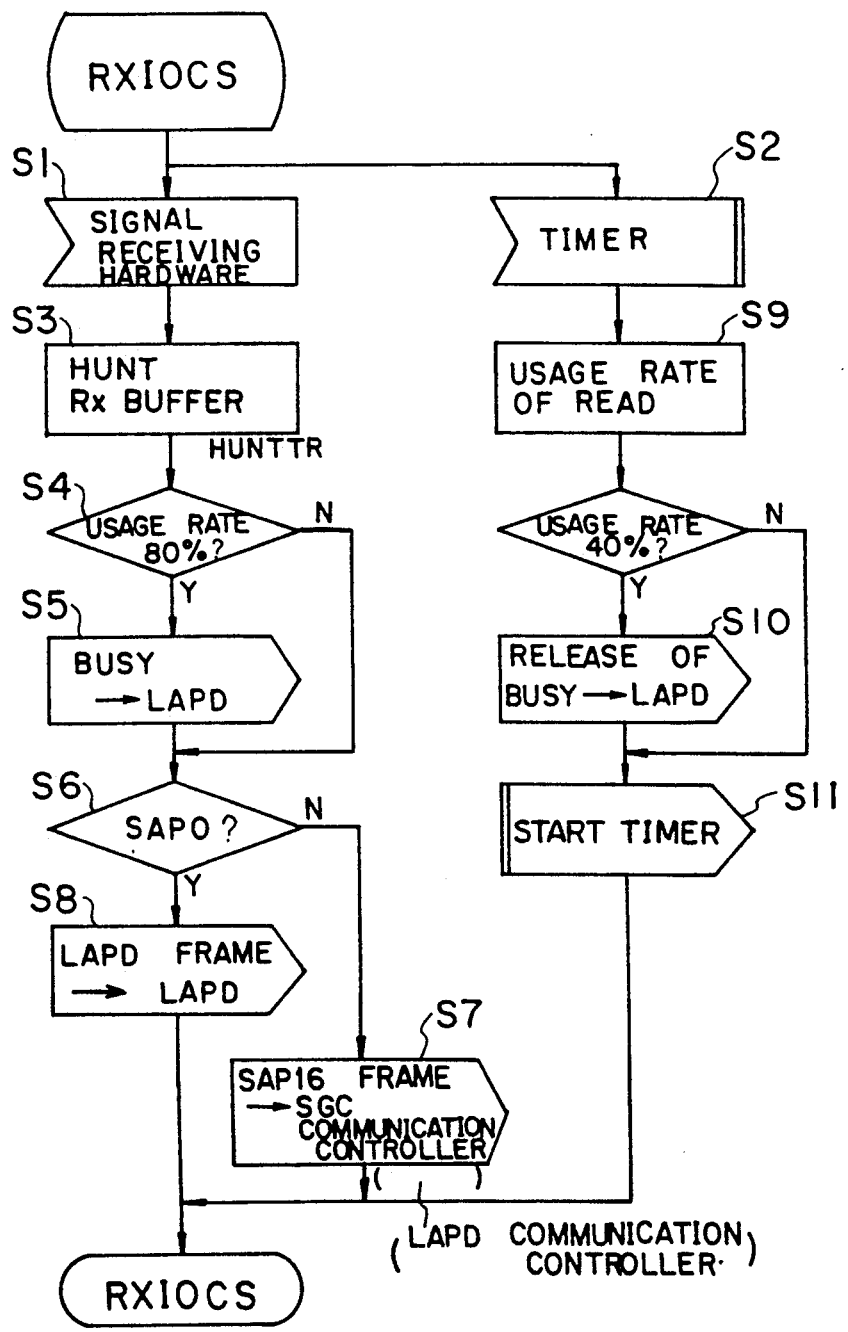
FIG. 5 is a flowchart illustrating the operations of the RXIOCSs.

FIG. 5 is a flowchart illustrating the operations of the RXIOCSs 42-1 and 44-3.

The RXIOCSs 42-1 and 44-3 start their operations when their hardware receives an external signal (step S1) or when a timer invokes them (step S2). When their hardware receives a signal (step S1), a receiving buffer is hunted in step S3. The RXIOCSs 42-1 and 44-3 judge whether or not the usage rates of the receiving buffers, e.g. receiving buffers 11, 12, 13 and 15, are over 80%. If the usage rates are over 80% (Y), the RXIOCSs 42-1 and 44-3 respectively notify the LAPD reception controllers 42-2 and 44-4 of the busy state in step S5 and the process proceeds to step S6. If the usage rates are not over 80% (N), the process skips step S5 and proceeds to step S6, where the RXIOCSs 42-1 and 44-3 judge whether an SAP0 frame or an SAP16 frame performs a communication. If an SAP0 frame does not perform a communication (N), the RXIOCSs 42-1 and 44-3 emit an SAP16 frame to the SGC communication controller 42 and the SAP0 LAPD controller 44 in step S7. If an SAP0 frame performs a communication (Y), the RXIOCSs 42-1 and 44-3 emit an LAPD frame respectively to the LAPD reception controllers 42-2 and 44-4.

When a timer invokes the RXIOCSs 42-1 and 44 3 in step S2, the process proceeds to step S9, where the usage rates of the buffers are read. Then, the RXIOCSs 42-1 and 44-3 judge whether or not the usage rates are equal to or under 40%. The RXIOCSs 42-1 and 44-3 clear a busy flag when the usage rates are equal to or under 40% (Y). When the usage rates are over 40% (N), or when the process in step S10 is completed, the timer reinvokes the RXIOCSs 42-1 and 44-3 and the process in step S11 finishes.

Figure 6:
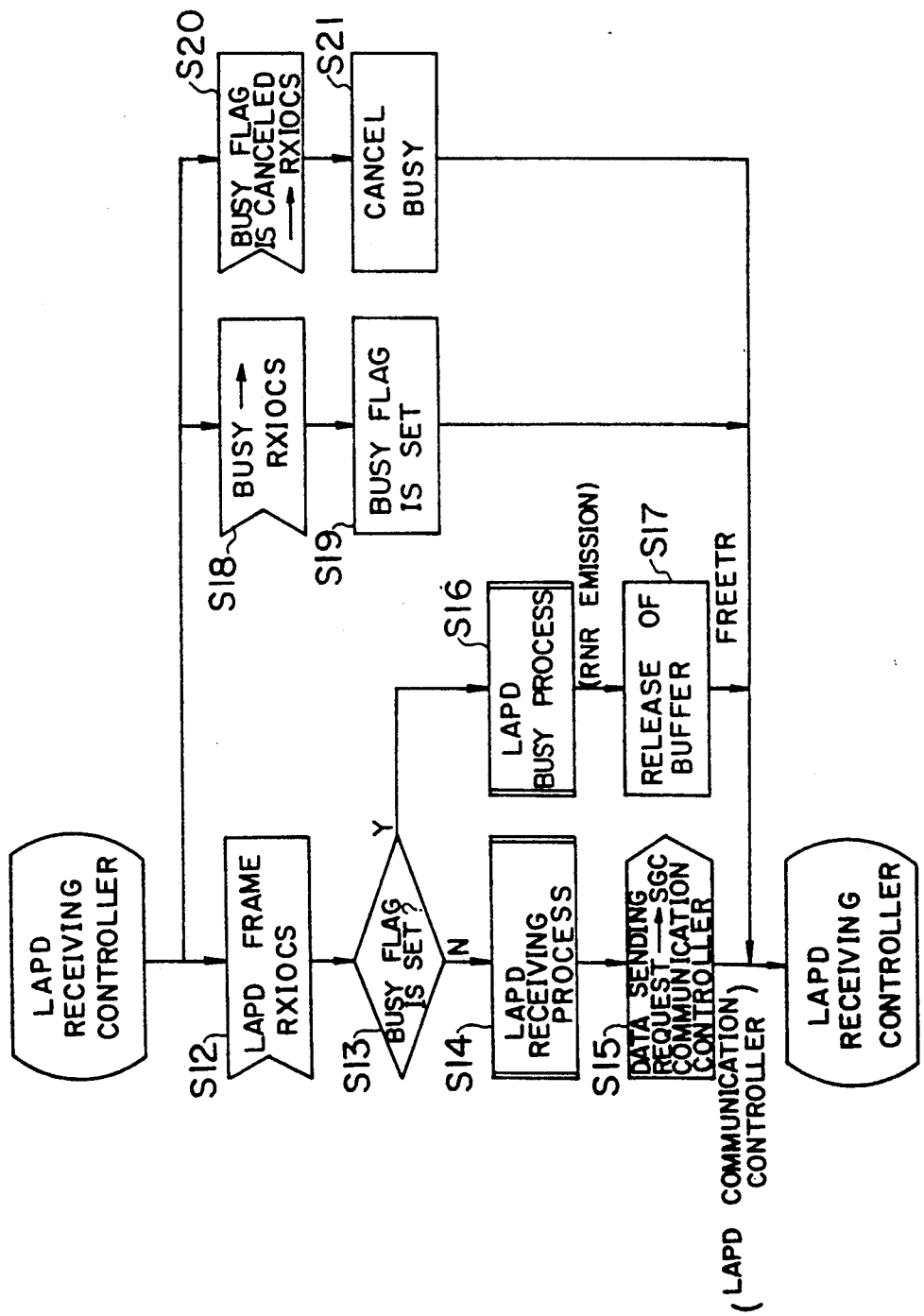
FIG. 6 is a flowchart illustrating the operations of linked layer access procedure D channel (LAPD) reception controllers.

FIG. 6 is a flowchart illustrating the operations of the LAPD reception controllers 42-2 and 44-4.

The LAPD reception controllers 42-2 and 44-4 start their operations on receipt of an LAPD frame from the RXIOCSs 42-1 and 44-3 described earlier in step S12, on receipt of a busy state in step S13, or on clearance of a busy state in step S20.

When the LAPD reception controllers 42-2 and 44-4 receive an LAPD frame from the RXIOCSs 42-1 and 44-3 in step S12, the LAPD reception controllers 42-2 and 44-4 judge whether or not the current state is busy in step S13. On judging the current state not being busy (N) in step S13, the LAPD reception controllers 42-2 and 44-4 execute an LAPD frame reception in step S14, and output a data transmission request to the SGC communication controller 42 and the SAP0 LAPD controller 44. On judging the current state being busy (Y) in step S13, the LAPD reception controllers 42-2 and 44-4 execute a "busy state" processing for an LAPD frame in step S16 and output the RNR signal. Then, the LAPD reception controllers 42-2 and 44-4 free up buffers in step S17.

On receipt of a busy state in step S18, the LAPD reception controllers 42-2 and 44-4 set a flag indicating the current state being busy. On receipt of a busy clearance in step S20, the LAPD reception controllers 42-2 and 44-4 reset a flag indicating the current state being busy.

Figure 7:
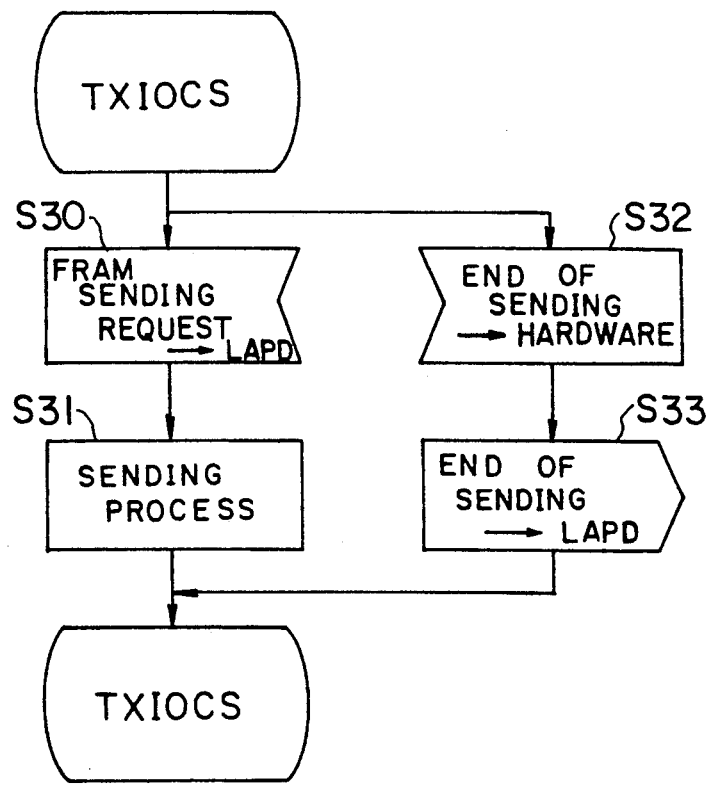
FIG. 7 is a flowchart illustrating the operations of the TXIOCSs.

FIG. 7 is a flowchart illustrating the operations of the TXIOCSs 42-1 and 44-2.

The TXIOCSs 42-1 and 44-2 respectively control transmission requests from the LAPD controllers 42-3 and 44-1 and their termination. Upon receiving a frame transmission request in step S30, the TXIOCSs 42-1 and 44-2 execute frame transmissions in step S31. When their hardware notifies the TXIOCSs 42-1 and 44-2 of a completed transmission in step S32, the TXIOCSs 42-1 and 44-2 notify the LAPD reception controllers 44-4 and 42-2 of the completed transmission in step S33.

Figure 8:
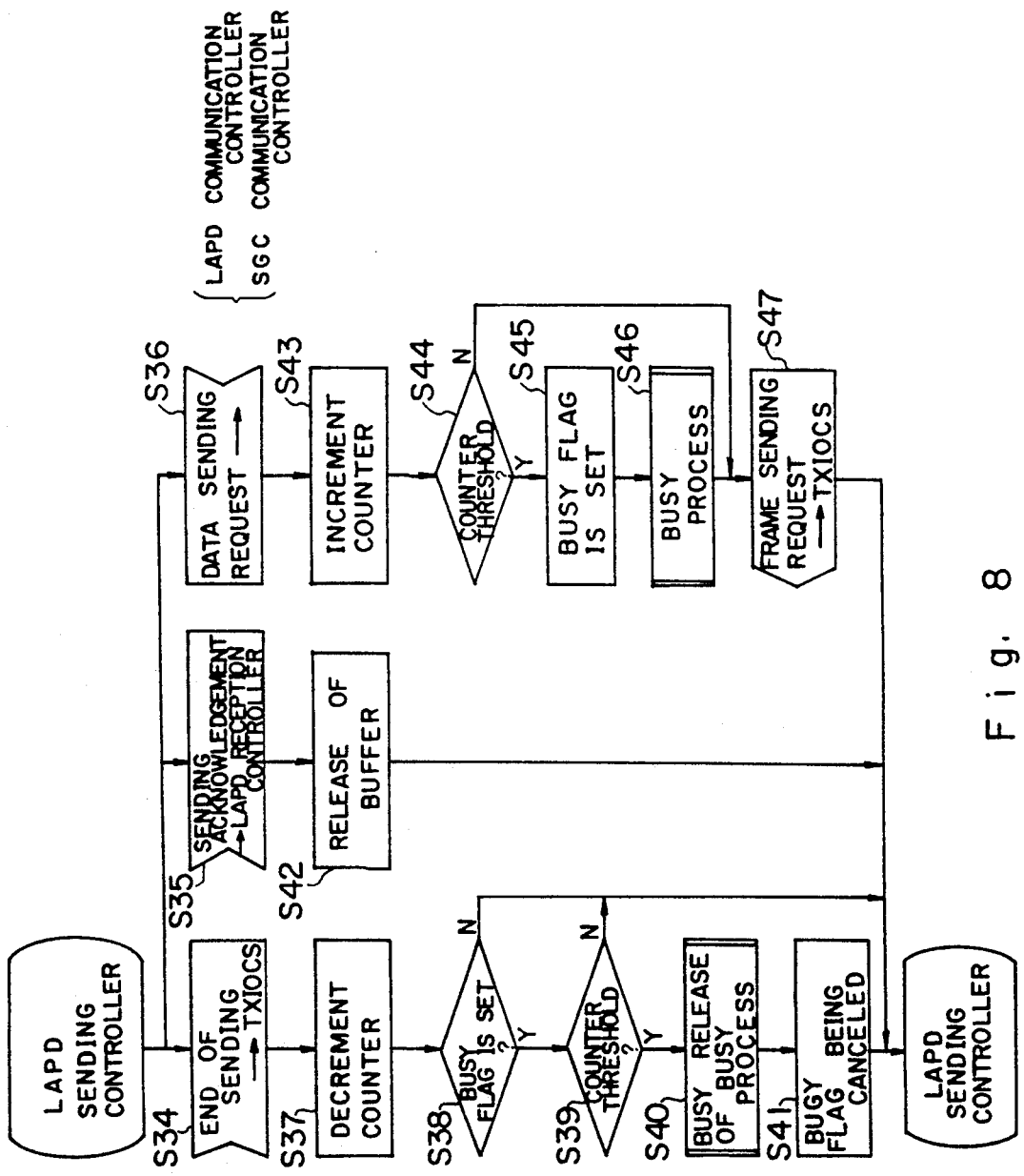
FIG. 8 is a flowchart illustrating the operations of the linked layer access procedure D channel (LAPD) transmission controllers.

FIG. 8 is a flowchart illustrating the operations of the LAPD transmission controllers 42-3 and 44-1.

The LAPD transmission controllers 42-3 and 44-1 start their operations upon completing transmissions from the TXIOCSs 44-2 and 42-4 in step S34, upon confirming transmission receipts from the LAPD reception controllers 42-2 and 44-4 in step S35, or upon receiving a data transmission request from the SGC communication controller 42 and from the SAP0 LAPD controller 44 in step S36.

When the TXIOCS 42-4 and 44-2 complete transmissions in step S34, the LAPD transmission controllers 42-3 and 44-1 decrement a counter value in step S37. Then, the LAPD transmission controllers 42-3 and 44 1 judge whether or not the current state is busy in step S38. Upon judging the current state being busy (Y) in step S38, the LAPD transmission controllers 42-3 and 44-1 judge whether or not the counter value is less than a threshold value in step S39. When the counter value is less than the threshold value (Y) in step S39, the LAPD transmission controllers 42-3 and 44-1 clear the busy state in step S40 and cancel the busy flag in step S41. When the counter value is not less than the threshold value (N) in step S39, or upon judging the current state not being busy (N) in step S38, the LAPD transmission controllers 42-3 and 44-1 terminate their processes "as is".

Upon confirming transmission receipts from the LAPD reception controllers 42-2 and 44-4 in step S35, the LAPD transmission controllers 42-3 and 44-1 release the buffers used in the confirmed transmission in step S42.

Upon receiving a data transmission request from the SGC communication controller 42 and from the LAPD controller 44 in step S36, the LAPD transmission controllers 42-3 and 44-1 increment the counter value in step S43 and judge whether or not the counter value is equal to or greater than a threshold value in step S44. If the LAPD transmission controllers 42-3 and 44-1 judge that the counter value is equal to or greater than the threshold value (Y) in step S44, the LAPD transmission controllers 42-3 and 44-1 sets a busy flag in step S45 and performs a "busy state" processing in step S46. The "busy state" processing is a notification to the PSS 23.

Upon judging the counter value being below the threshold value in step S44, or after executing the "busy state" processing in step S46, the LAPD transmission controllers 42-3 and 44-1 output a frame transmission request to the TXIOCS 42-4 and 44-2.

Figure 9:
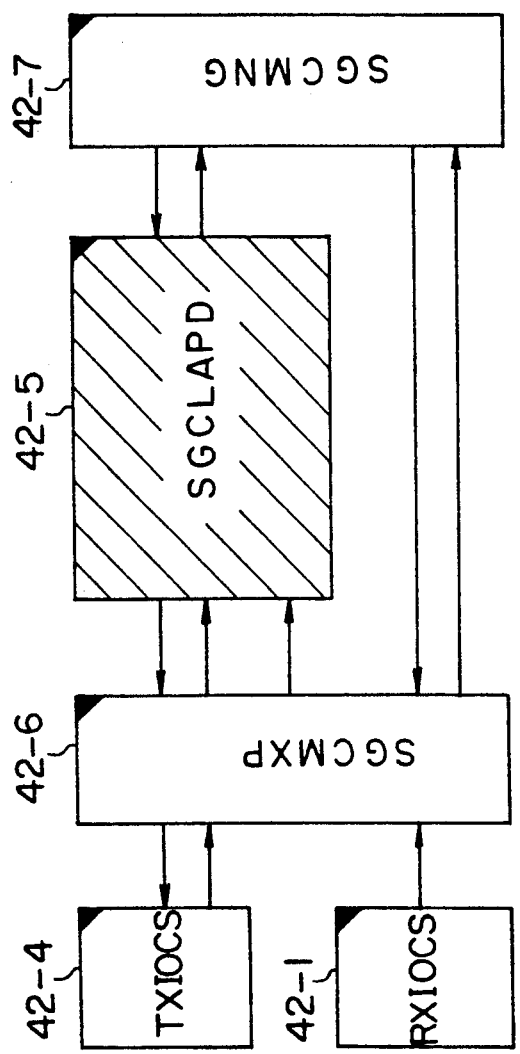
FIG. 9 shows the configuration of an SGC.
Figure 11A:
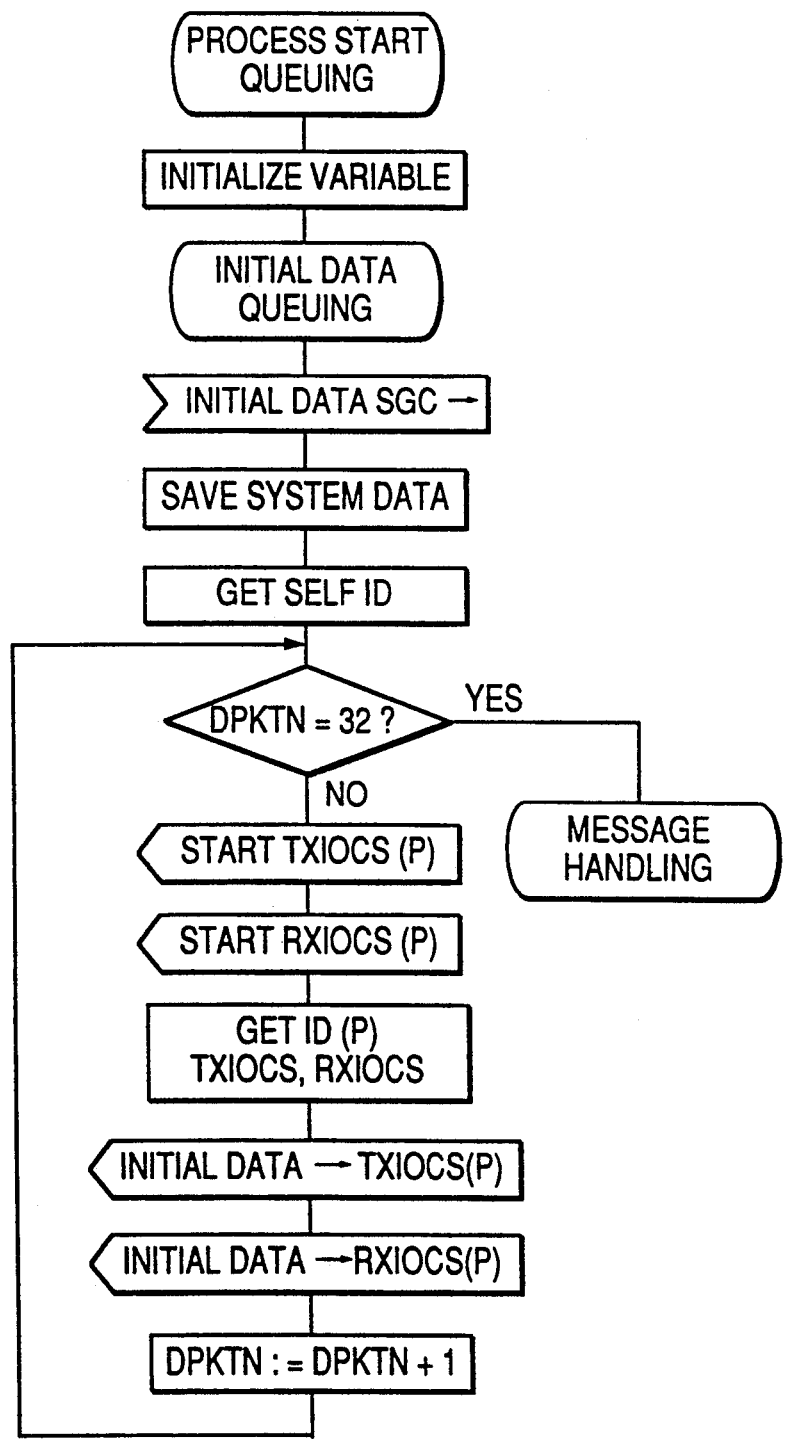
FIGS. 11a-x illustrate in detail the operation of a PKTCNTL.
Figure 11B:
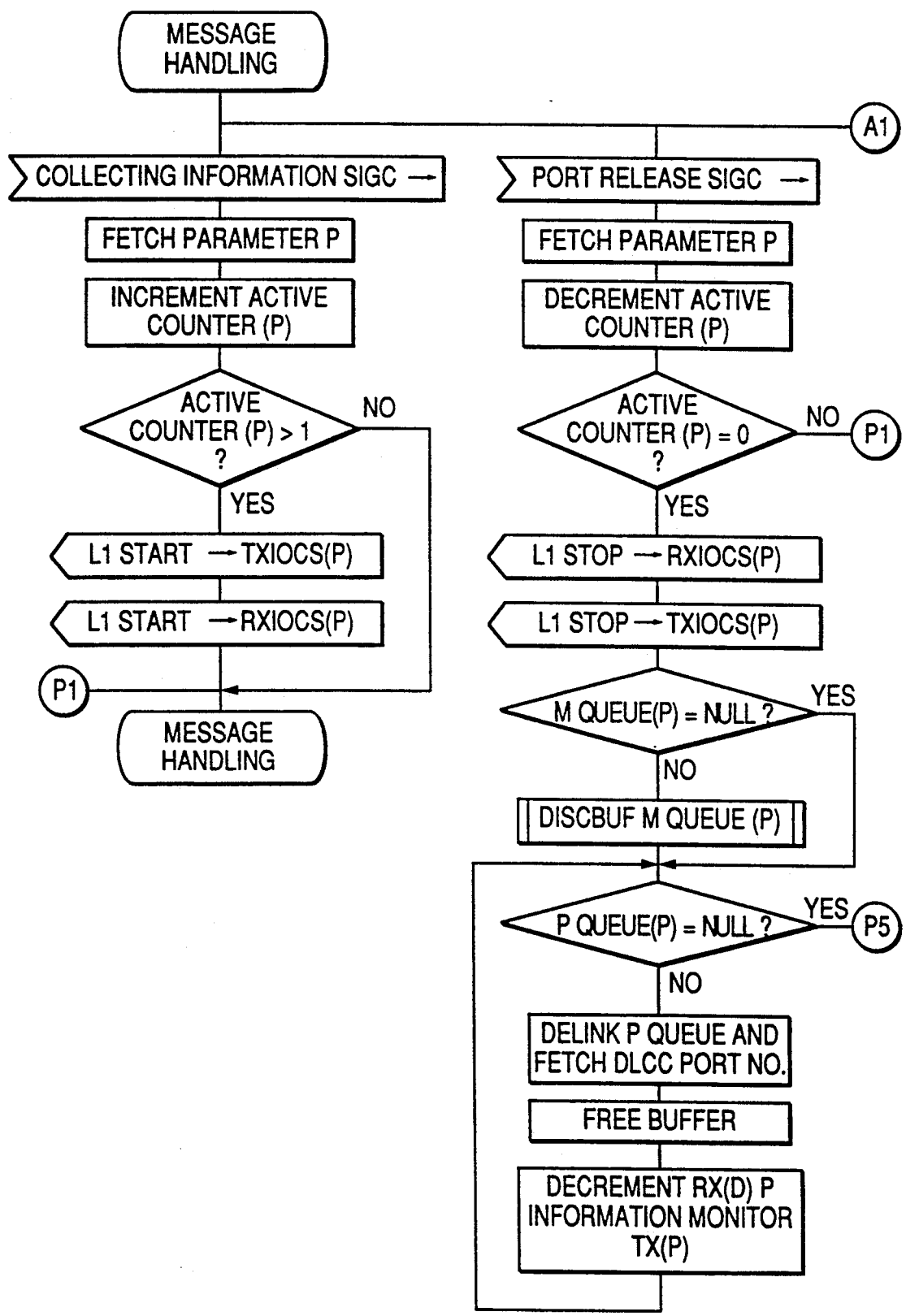
Figure 11C:
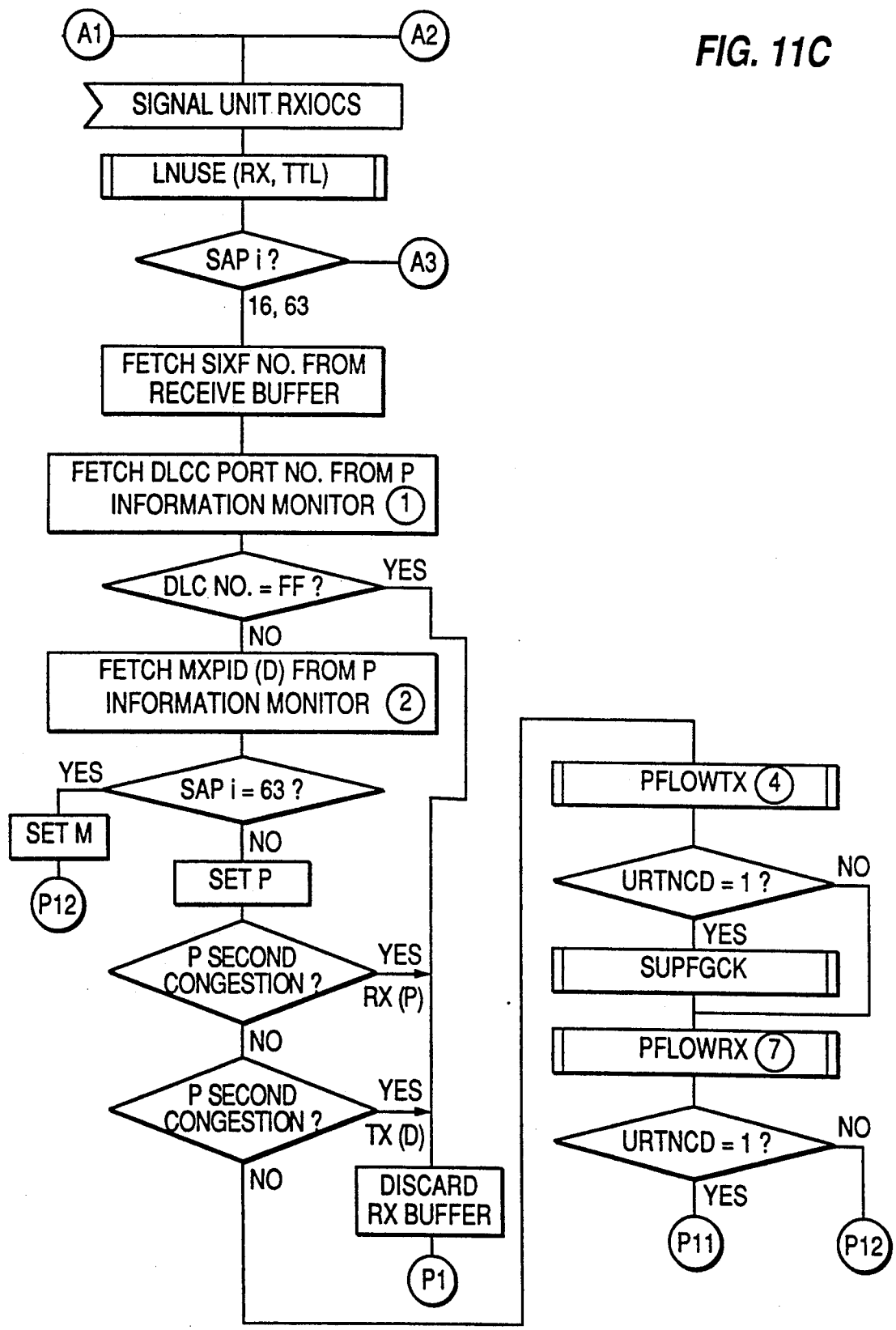
Figure 11D:
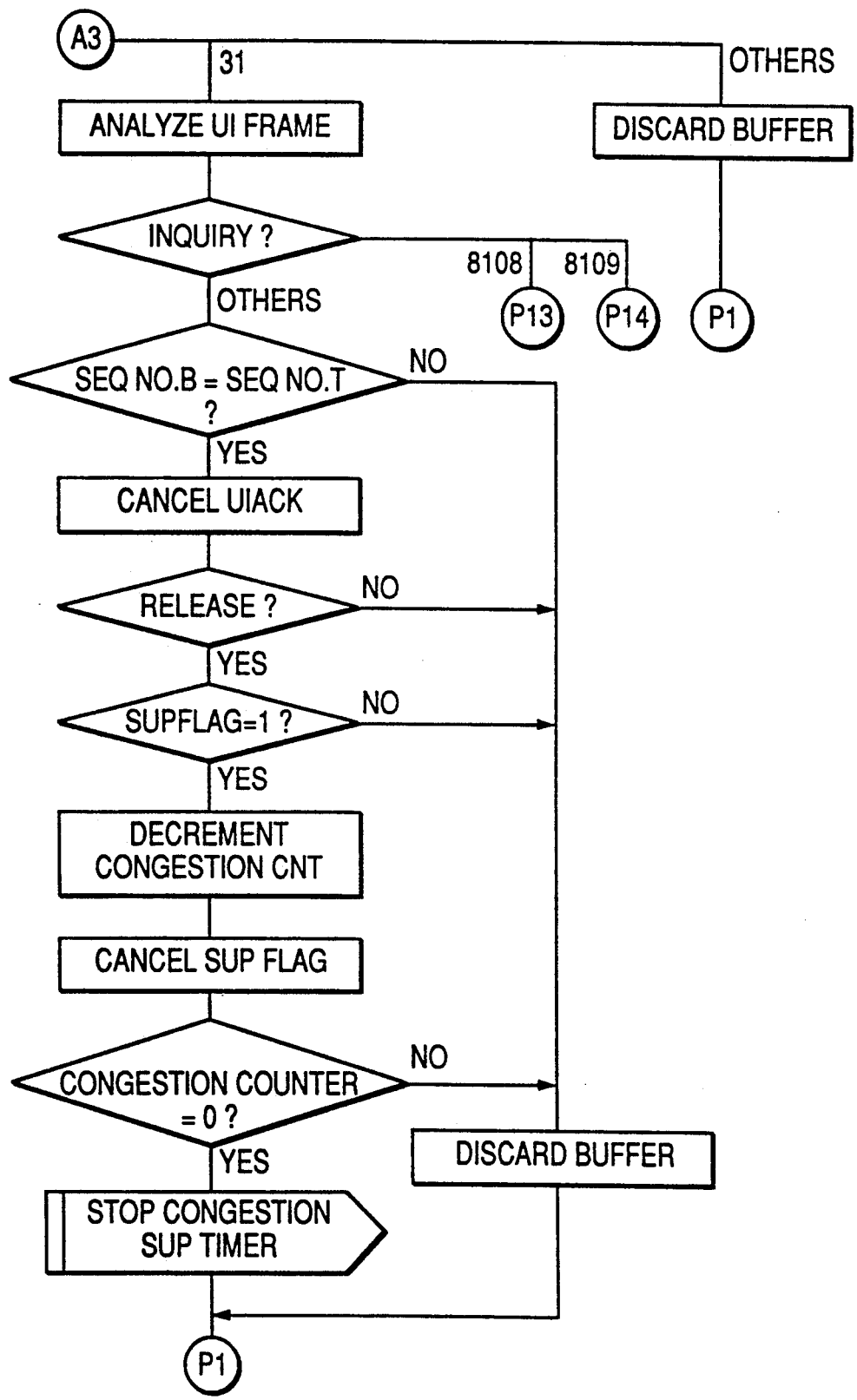
Figure 11E:
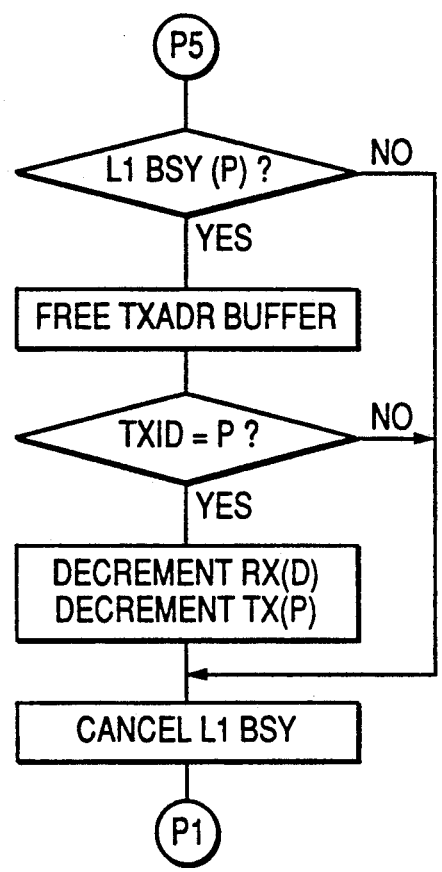
Figure 11F:
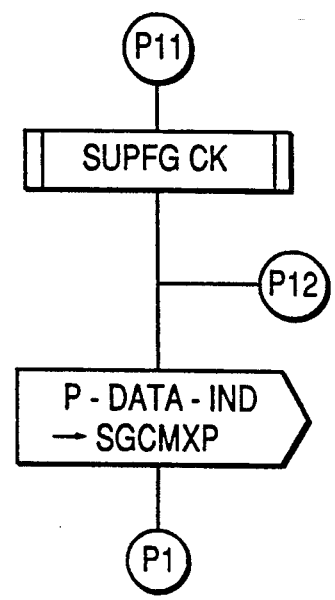
Figure 11H:
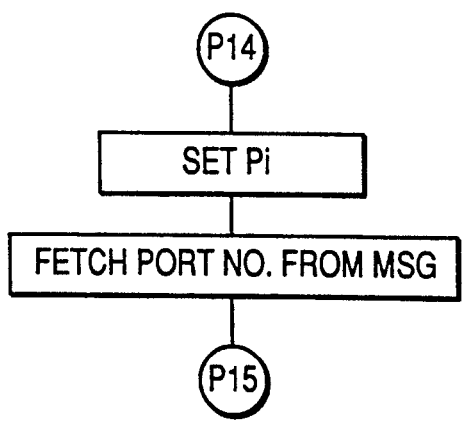
Figure 11G:
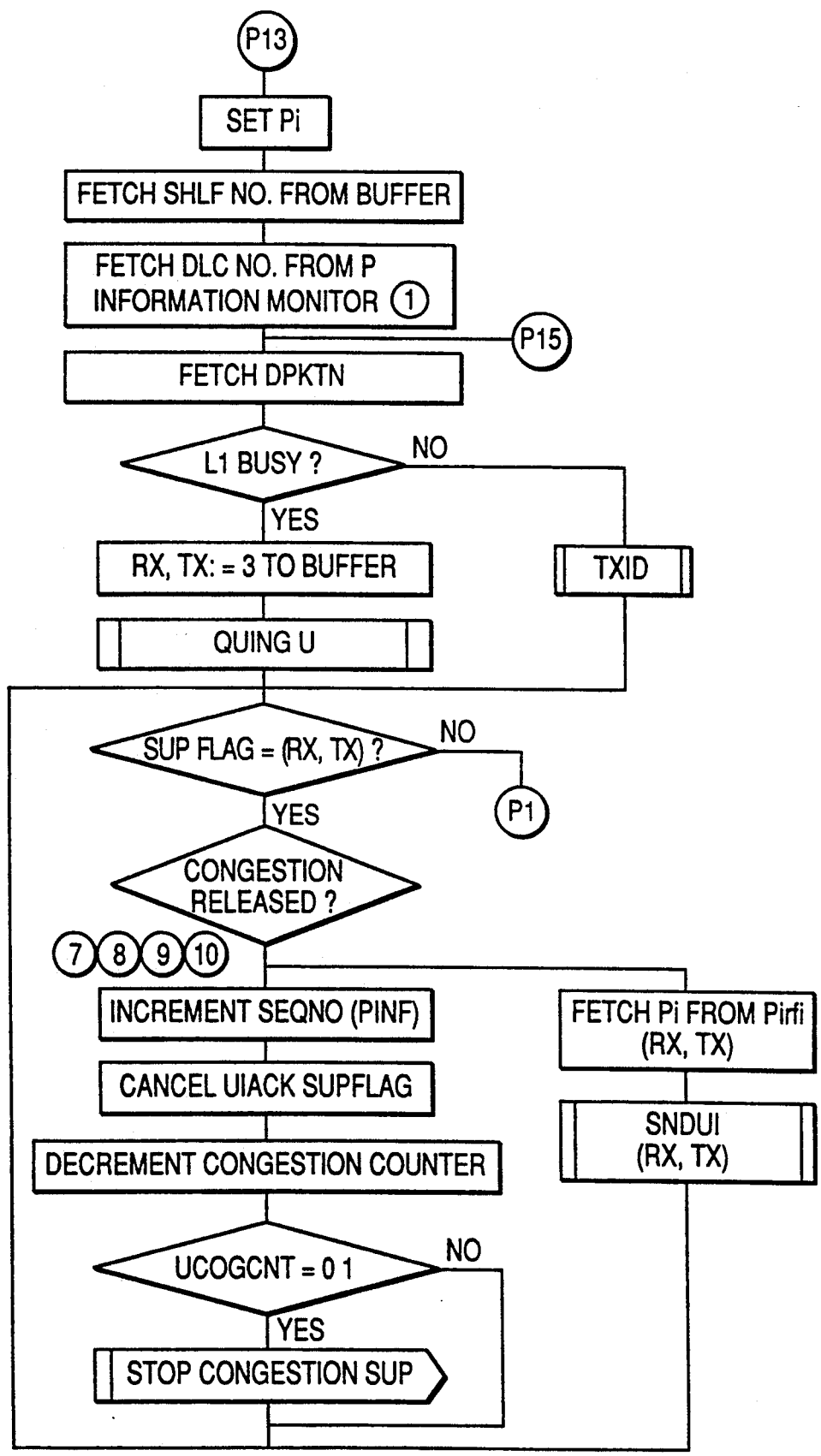
Figure 11I:
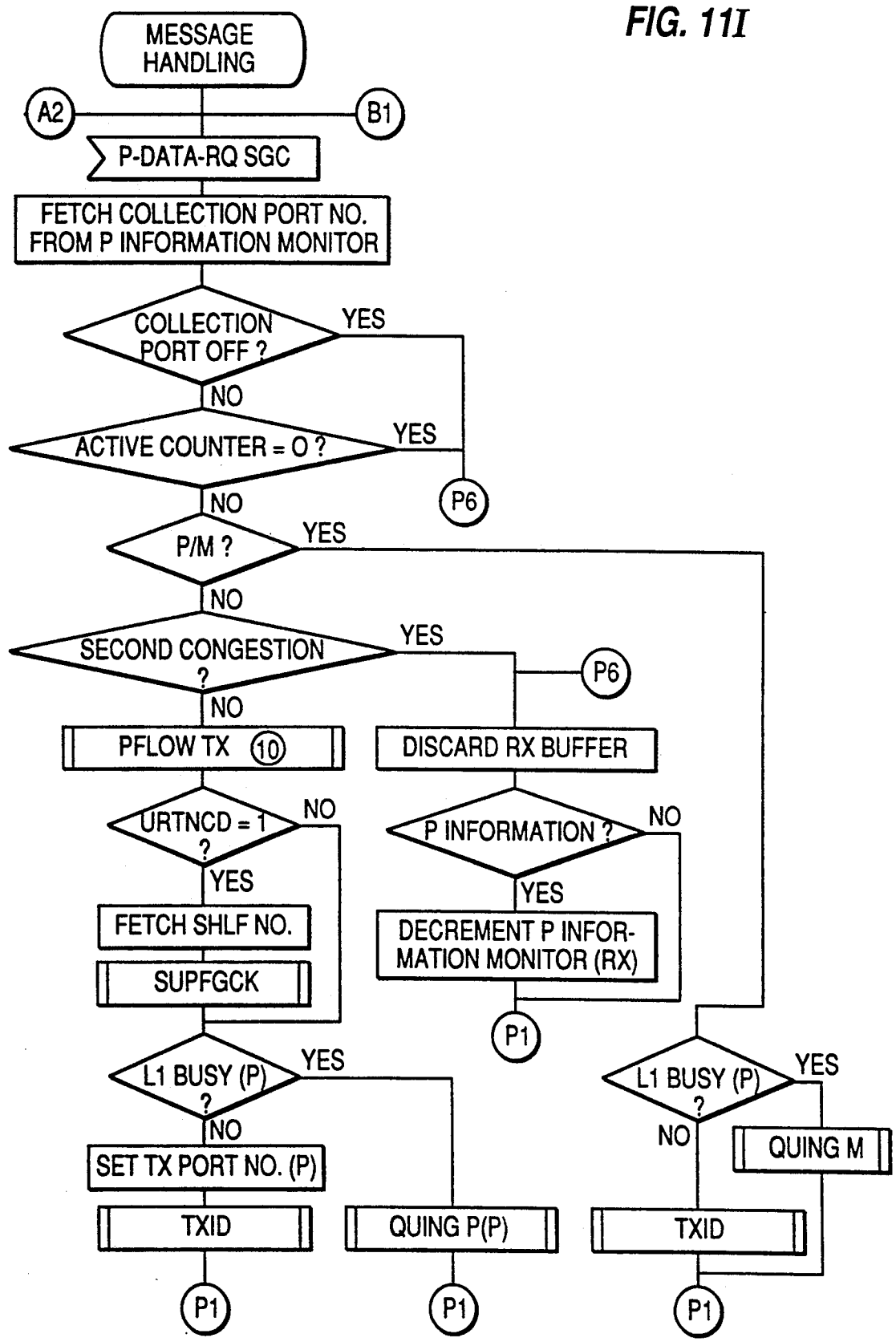
Figure 11J:
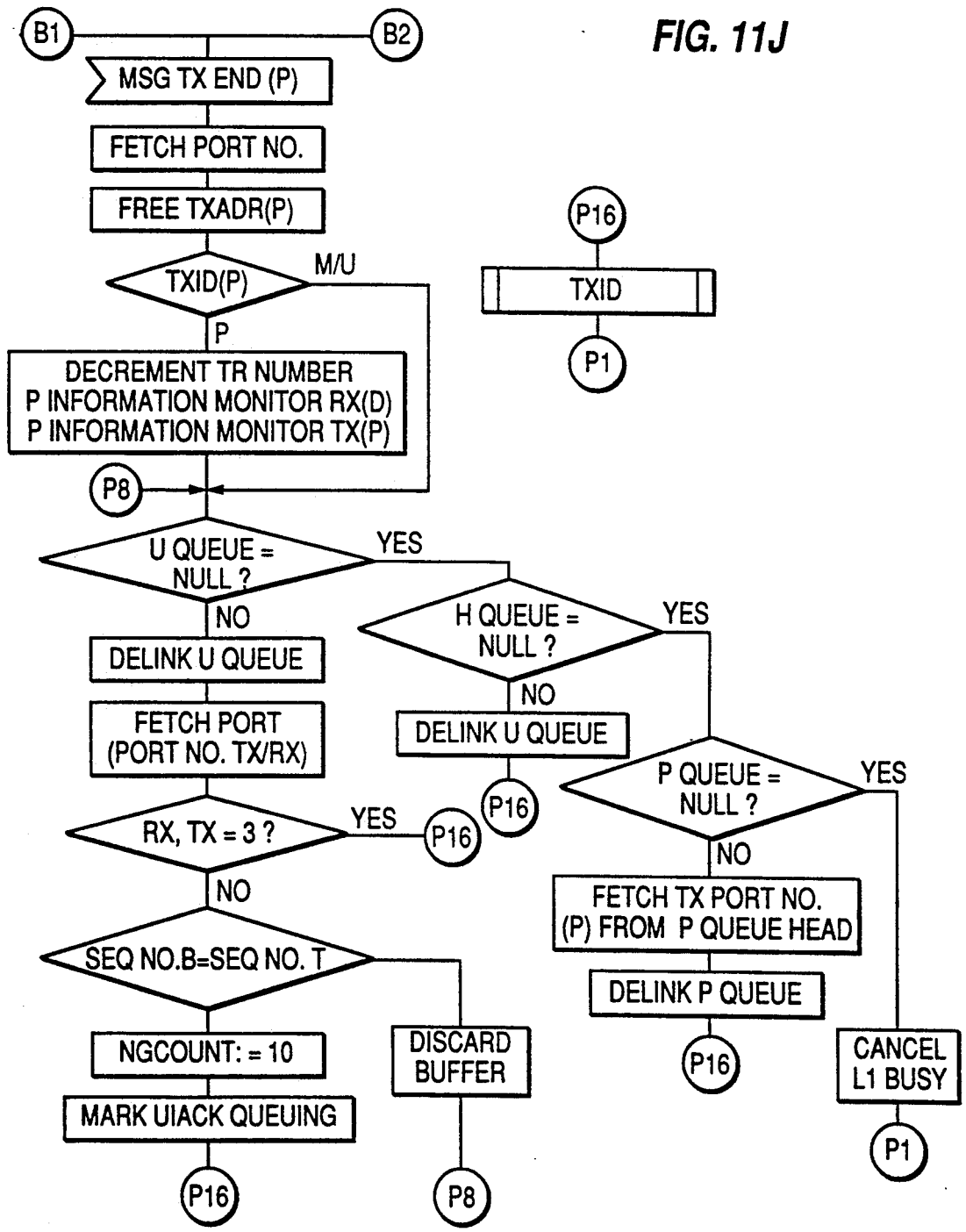
Figure 11K:
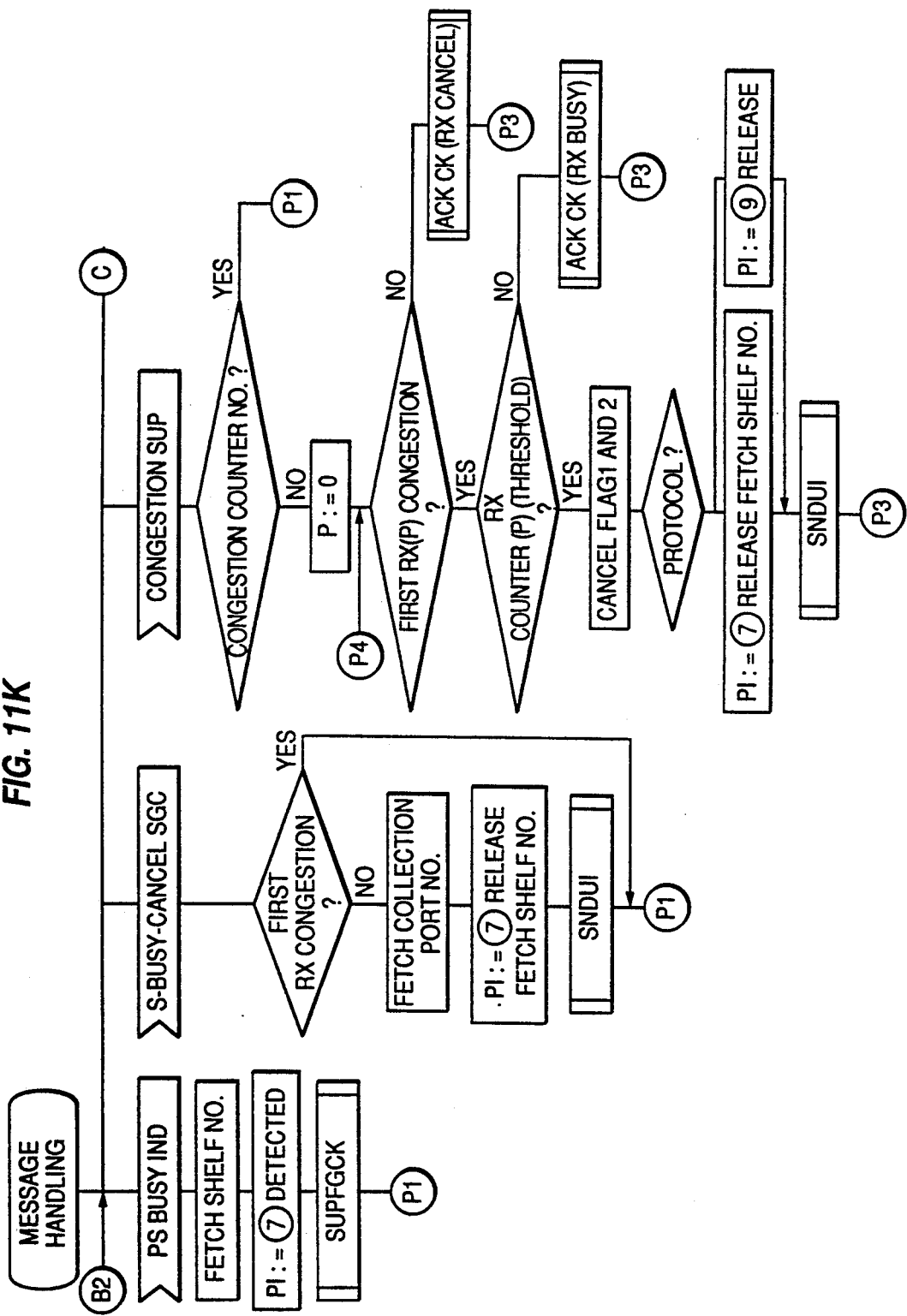
Figure 11L:
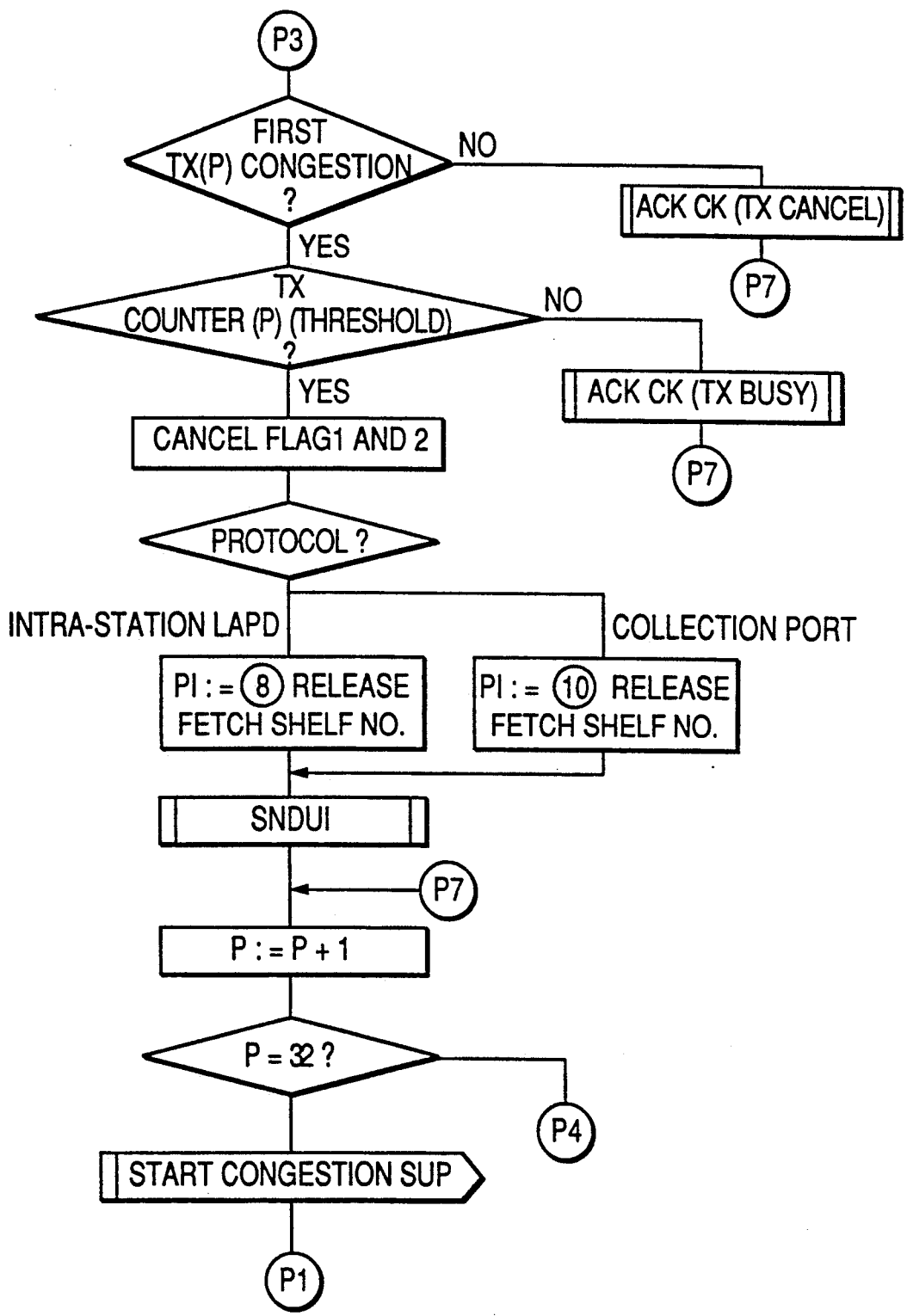
Figure 11M:
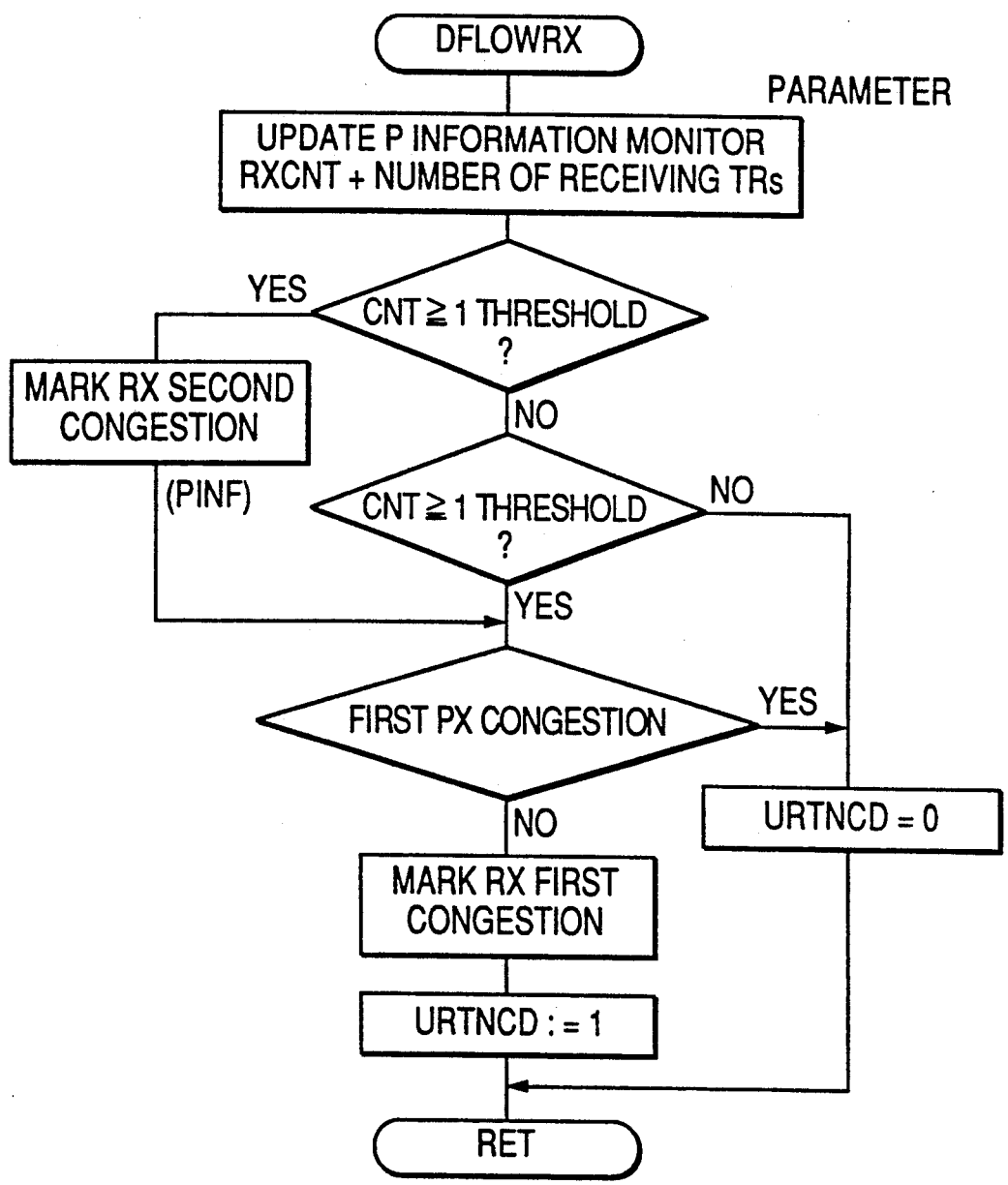
Figure 11N:
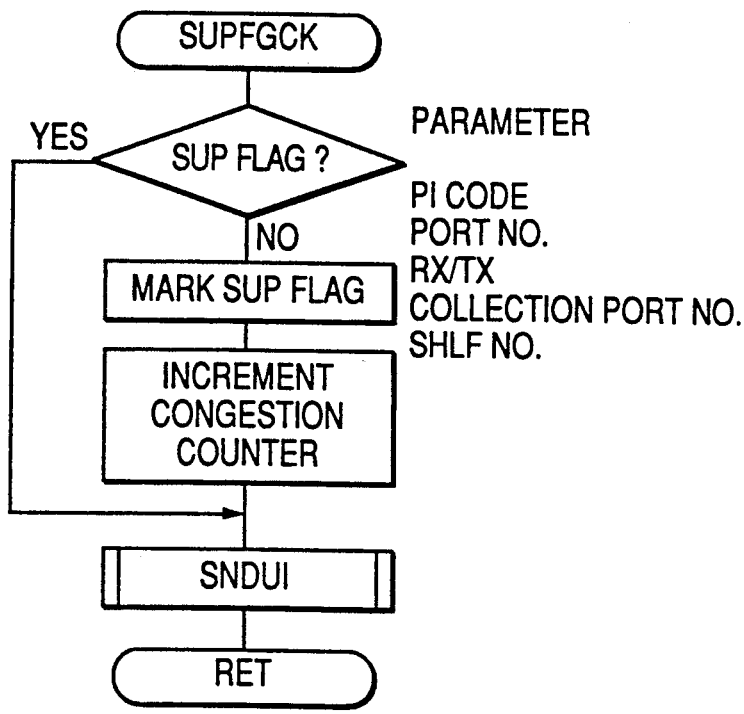
Figure 11R:
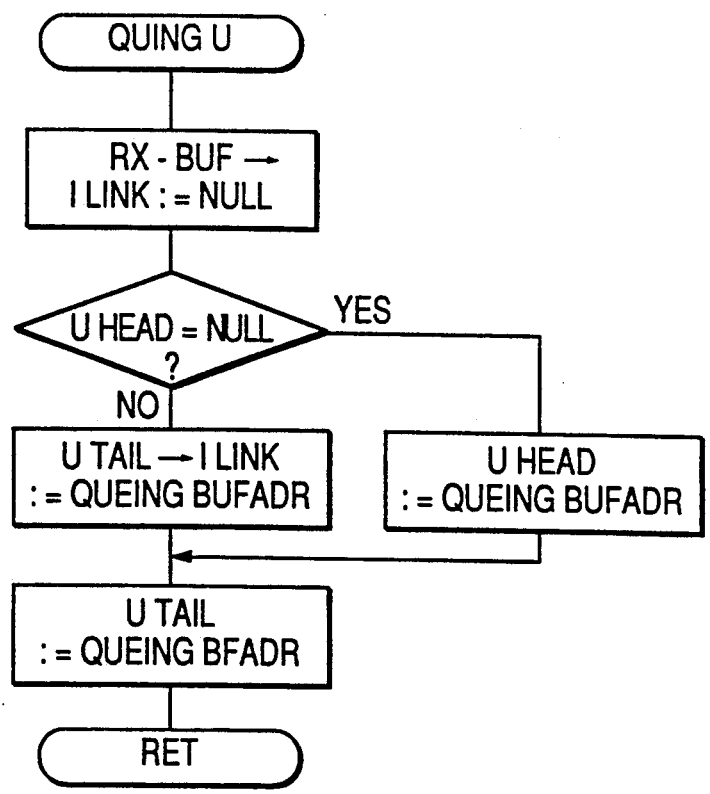
Figure 110:
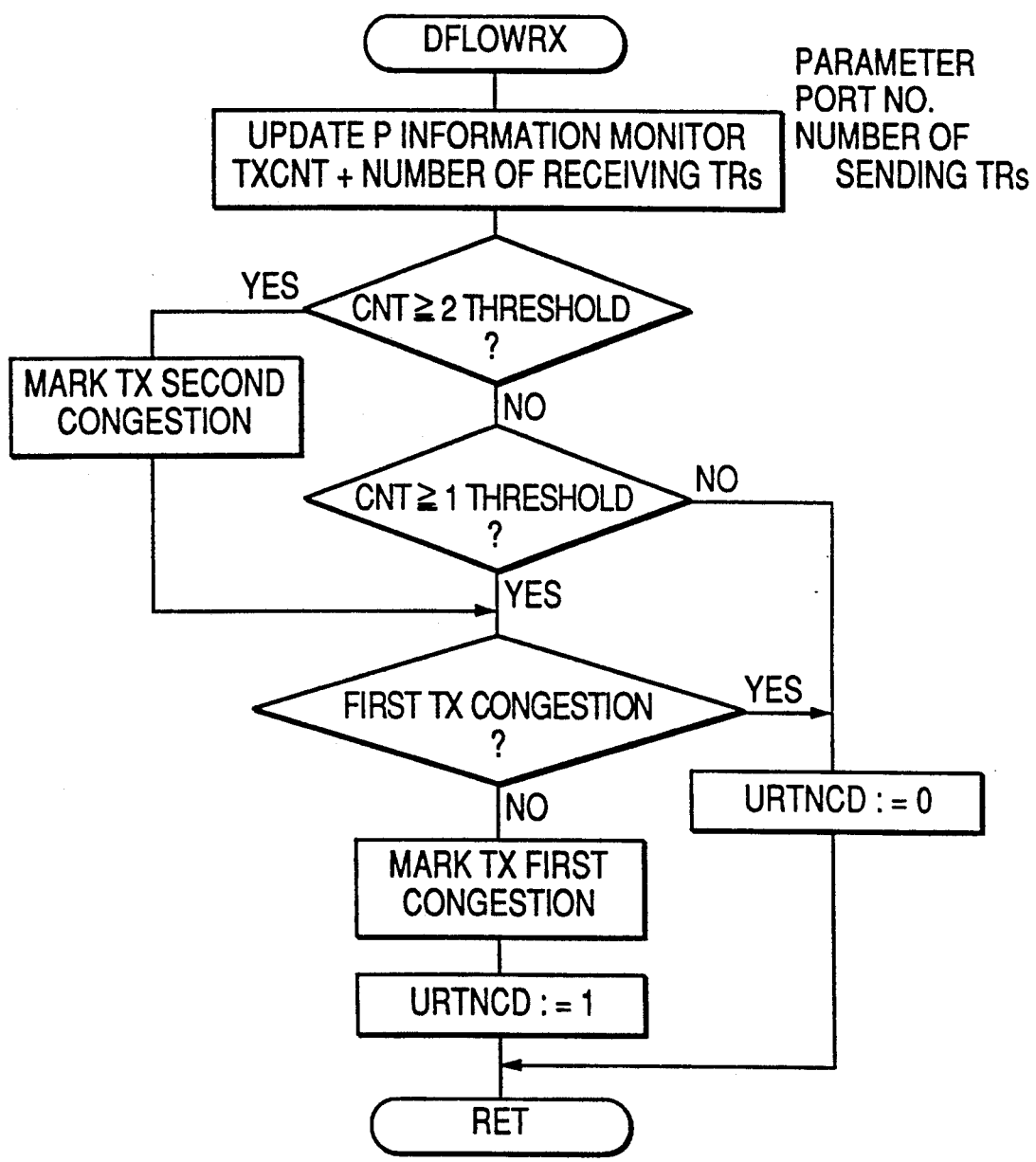
Figure 11P:
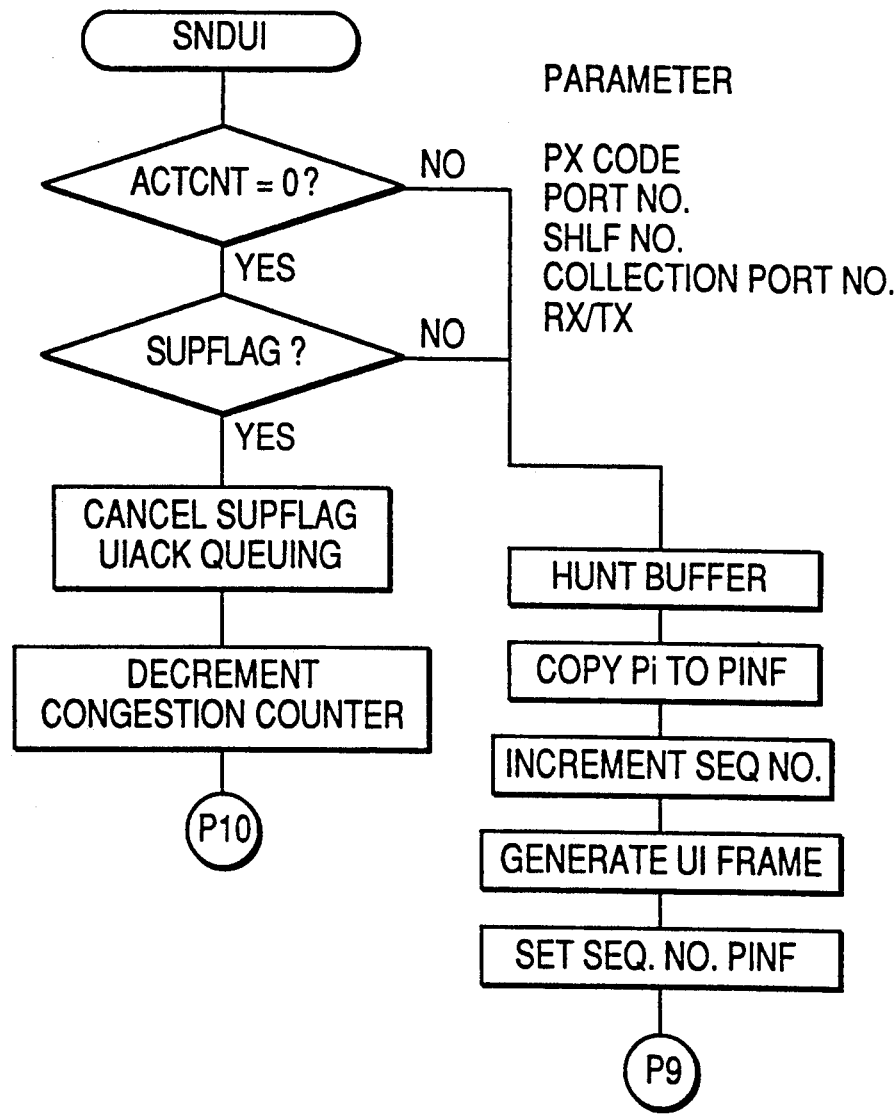
Figure 11Q:
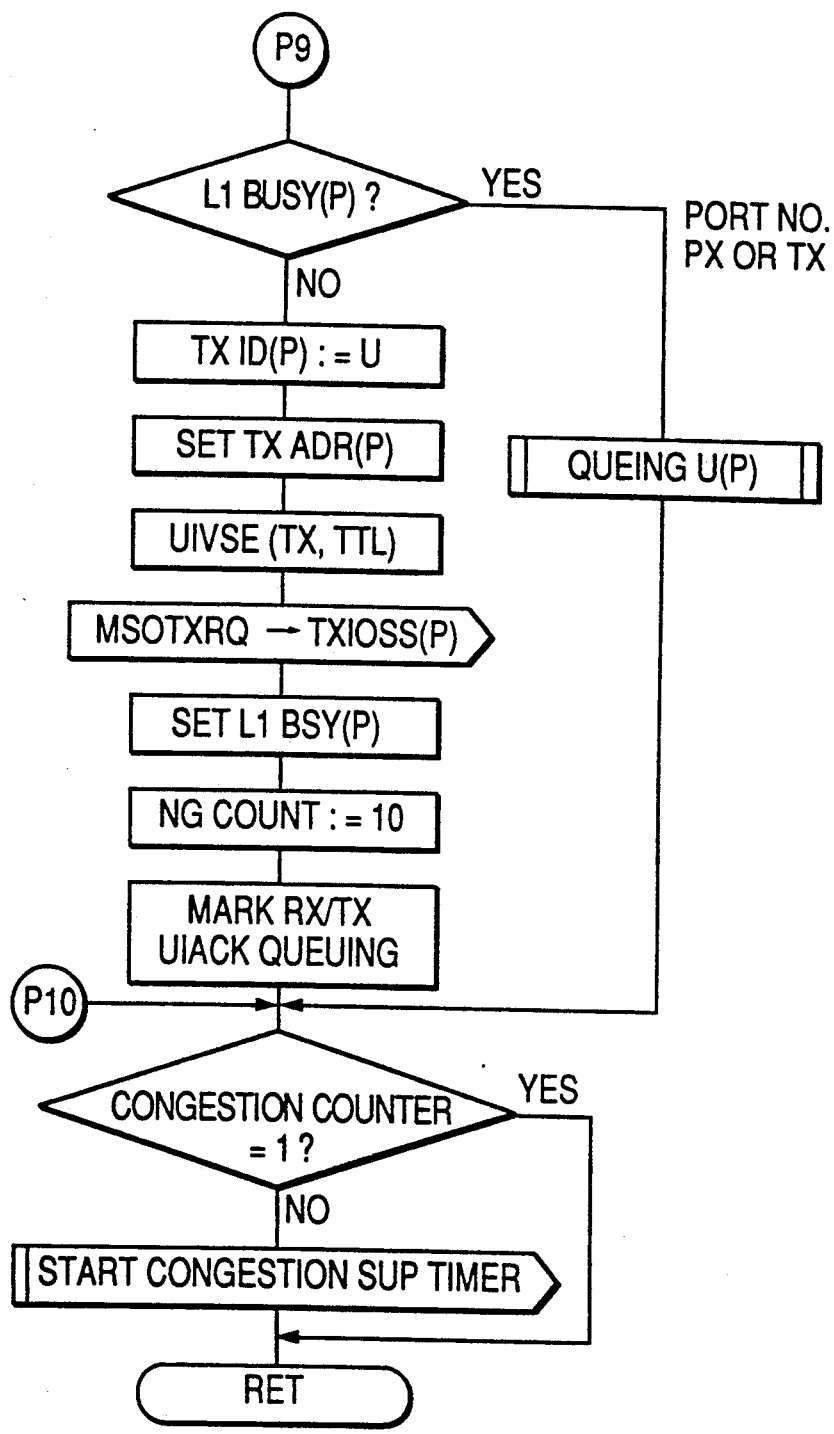
Figure 11S:
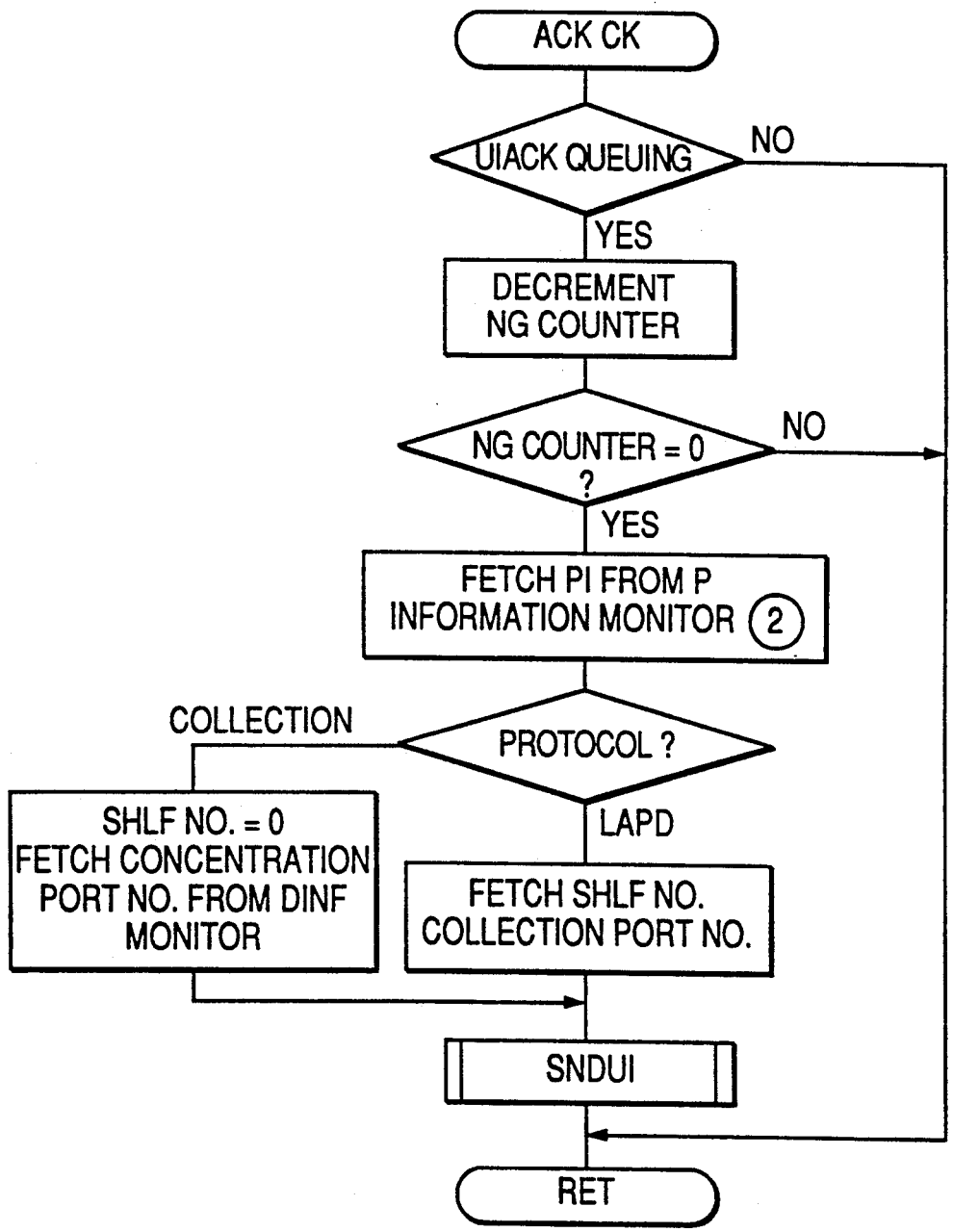
Figure 11T:
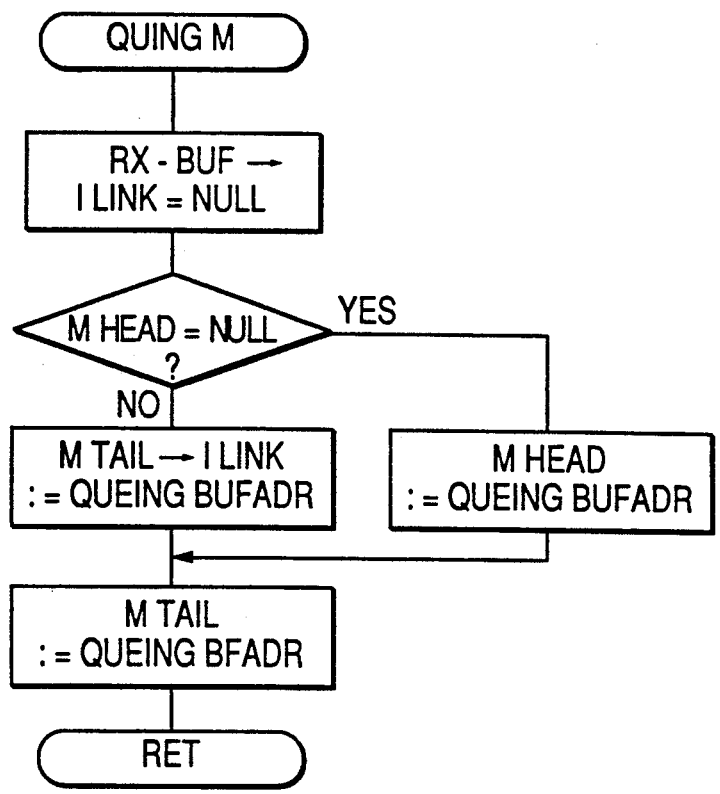
Figure 11U:
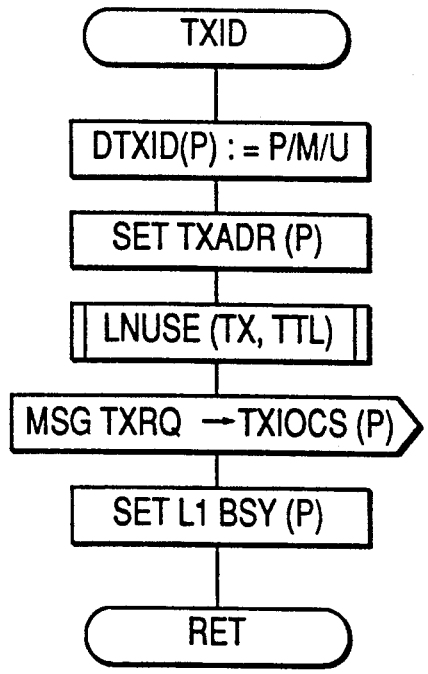
Figure 11V:
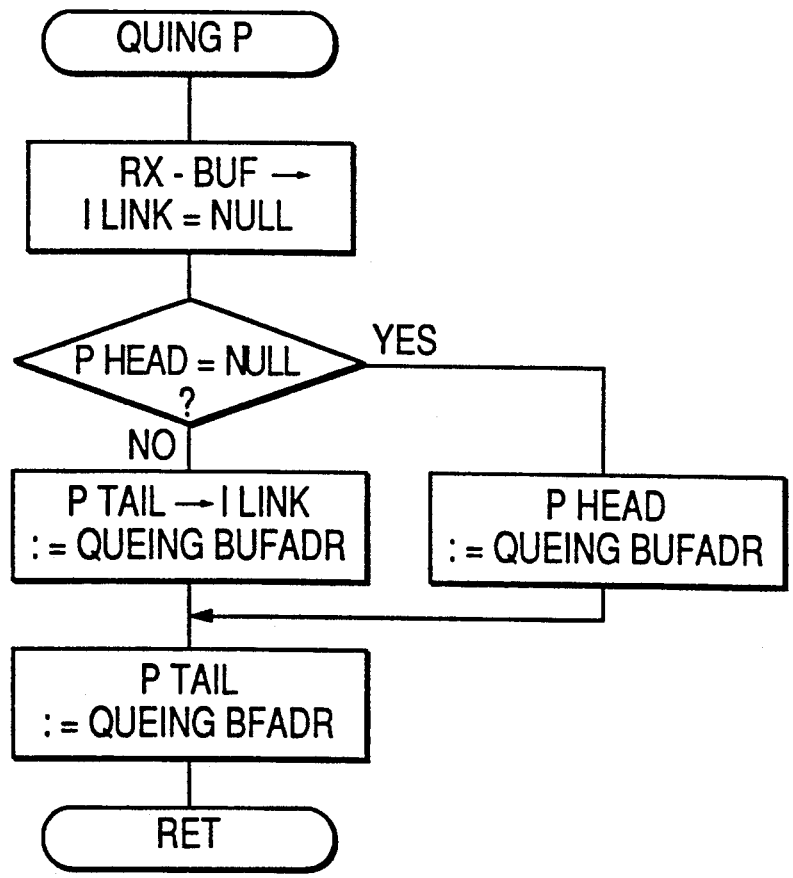
Figure 11W:
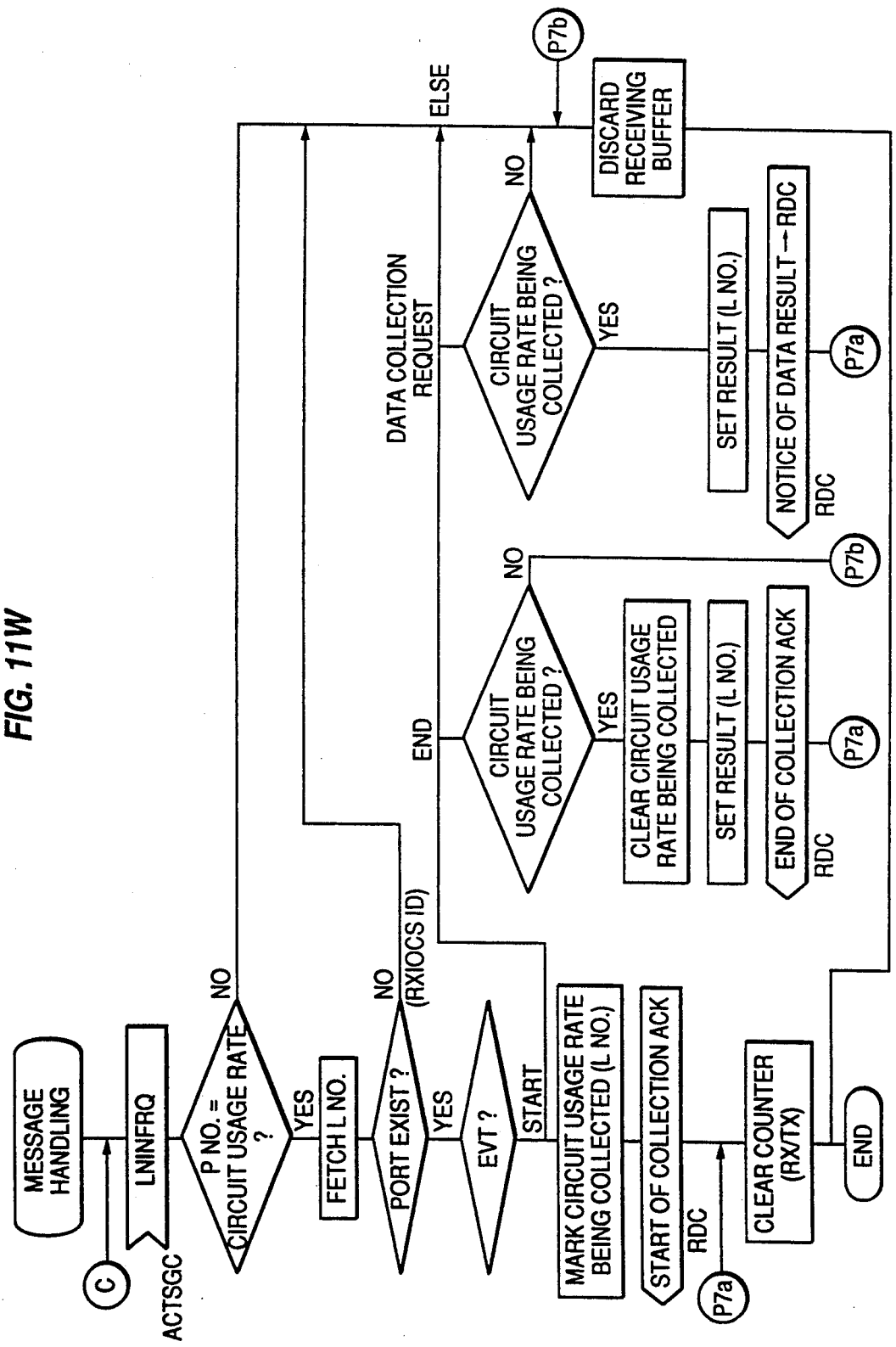
Figure 11X:
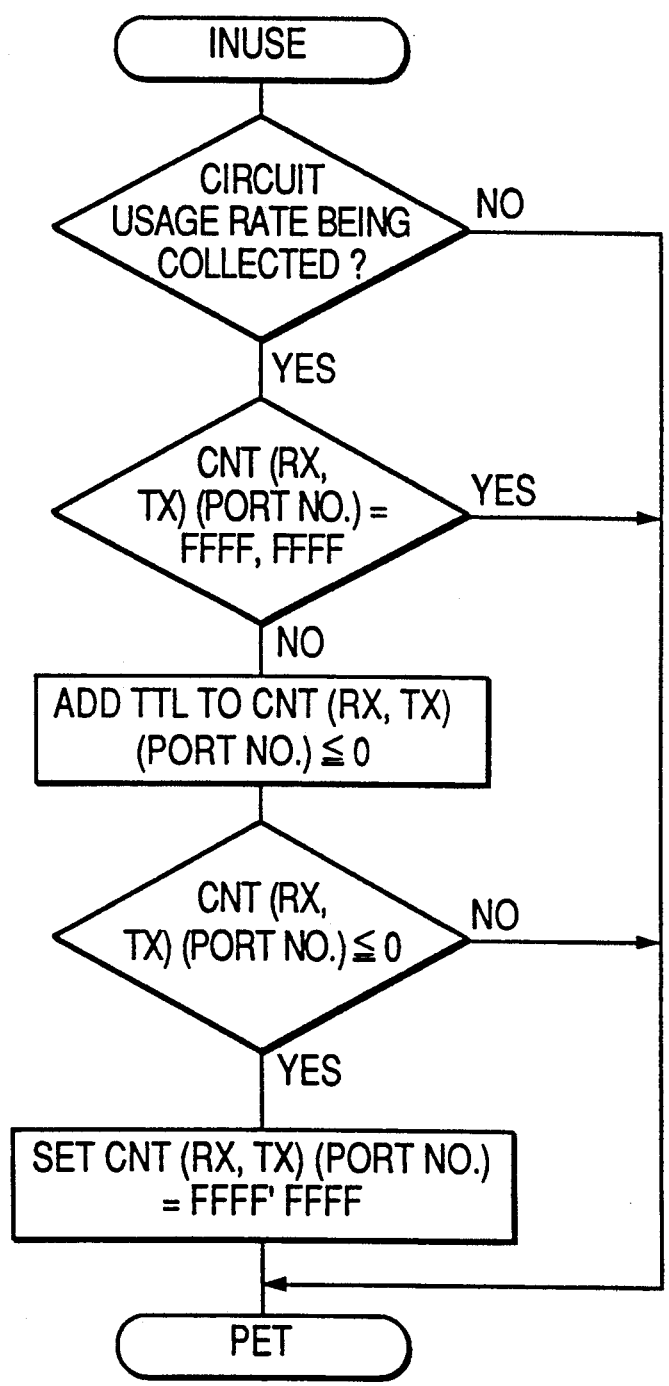

A processor controls the communication in an SGC. FIG. 9 shows a configuration of an SGC.

The LAPD reception control and the LAPD transmission control in the SGC are performed by an SGCLAPD 42-5. The SGCLAPD 42-5 is connected through a TXIOCS 42-4, an RXIOCS 42-1, and an SGCMXP 42-6. An SGCMNG 42-7 controls the SGCLAPD 42-5 and the SGCMNG 42-7.

An SGC 12 shown in FIG. 9 comprises one LAPD process per line. However, as an intra-station LAPD and a primary group interface LAPD are point-to point LAPDs, they do not support setting logical links.

The SGCLAPD 42-5 comprises a LAPD core and an SGCLAPD specific part, where the LAPD core conforms to the CCITT rec Q.921.

The congestion of a receiving buffer is controlled by the SGCLAPD specific part. The RXIOCS 42-1 monitors the usage rate of the receiving buffer through the TR route of the OS, thus performing the congestion control. The RXIOCS 42-1 performs the LAPD OWN BUSY control by releasing the detected congestion through the SGCMXP.

After receiving the notification of the detection/release of the congestion, the above described SGCLAPD specific part instructs the LAPD core to conduct the OWN BUSY control, which is performed based on the OR logic associated with the congestion in an upper-level unit. The detection/release of the congestion is also performed in an upper-level unit.

On the other hand, the congestion in an sending buffer is controlled in the SGCLAPD 42-5 by monitoring the usage rate of an sending buffer in each line upon receipt of an ACK from the correspondent station. That is, the LAPD core updates the utilization of each sending buffer upon receipt of an ACK. Then, the SGCLAPD specific part checks each threshold after the primitive process.

The SGC unit may intrude upon a transaction in another link when congestion arises in an sending buffer. This may incur a fault in the unit because only one pool is reserved for the transaction management in a channel. Therefore, when the secondary congestion continues for a predetermined time (for example, 200 msec. ×5=1 sec.), the SGCLAPD 42-5 is implemented to activate the autonomous link setting. The link-set releases all transactions in the LAPD, thus releasing the congestion of the sending buffer.

The congestion of the P information is controlled in a packet information controller (PKTCNTL) 52. The PKTCNTL detects the congestion in the sending buffer 28 connected to the DLCC interface, the receiving buffer 27 connected to the PSS interface, and the sending buffer 21 connected to the PSS interface; and detects the release of the congestion in the receiving buffer 19 connected to the DLCC interface, the sending buffer 28 connected to the DLCC interface, the receiving buffer 27 connected to the PSS interface, and the sending buffer 21 connected to the PSS interface. Then, the PKTCNTL sends in a UI frame a message indicating the congestion in a receiving buffer connected to the DLCC interface.

The more detailed explanation is given about the detection of the congestion and release, etc. as follows:

The congestion in the sending buffer 28 connected to the DLCC is detected as follows. When the SAP i of a frame received from the RXIOCS 42-1 is 16, a DLCC interface port is fetched from the circuit information, and the transmission counter corresponding to the P information monitor is incremented by the number of active transactions. When the transmission counter indicates the value larger than a primary congestion threshold, congestion notification is issued in a UI frame and a primary congestion flag is set. When the counter indicates the value larger than the secondary congestion threshold, a secondary congestion flag is set and all the following reception SAP16 frames are discarded.

The congestion in the receiving buffer 27 connected to the PSS interface is detected as follows. When the SAP i of the frame received from the RXIOCS 42-1 is 16, the reception counter of the corresponding port of the P information monitor is incremented by the number of active transactions. If the reception counter indicates the value larger than a primary congestion threshold, congestion notification is issued to the PSS in a UI frame and a primary congestion flag is set. When the counter indicates the value larger than the threshold, a secondary congestion flag is set and the following reception SAP 16 frames are discarded. However, UI frames are not discarded because they are processed by the PKTCNTL. Besides, as the M information are not discarded in principle, and transmitted taking priority of the PS information, it is not discarded in view of being released very soon.

The congestion in the sending buffer 21 connected to the PSS interface is detected as follows. If the SAPi of a frame is 16 and the SGCMXP 42-6 makes a transmission request, the transmission counter of the corresponding port in the P information monitor is incremented by the number of active transactions. When the counter indicates a value larger than a primary congestion threshold, a primary congestion flag is set. When the counter indicates a value larger than a secondary congestion threshold, a secondary congestion flag is set and all the following frames having the SAPi=16 are not transmitted but discarded.

The congestion notification of the receiving buffer 19 connected to the DLCC interface is issued to the PSS in a UI frame according to the congestion notification of the S or P information.

When the above described congestion is detected, the PKTCNTL activates a congestion supervise timer for detecting the release of the congestion. The cycle of the timer is, for example, 50 msec. ×4=200 msec.

When an end of transmission notification is issued by the TXIOCS 42-4, the above described transmission counter and the reception counter release transactions and, if the SAP of transmission frames is 16, decrement a reception counter connected to the DLCC interface by the number of released transactions according to the value of the transmission counter of the circuit interface of the P information monitor and the shelf number corresponding to the MACH channel number.

Then, the values of the reception and transmission counters are detected as follows to control the release of the congestion. According to the time-out notification issued by the congestion supervisor, values indicated by the reception and transmission counters are checked whether or not they are smaller than respective release thresholds. When they are smaller than respective thresholds, release of congestion notification is issued to the PSS in a UI frame, and the corresponding release of congestion flag is canceled.

Further, according to release notification of the S information issued by the SGCMXP 42-6, release of congestion notification is issued to the PSS in a UI frame unless the congestion of the P information is detected in an sending buffer or a receiving buffer in the DLCC interface.

As described above, the congestion notification is issued to the PSS in a UI frame. However, as a message is subject to be lost in a UI frame, an ACK is transmitted in a UI frame between the PSS and the PLCS and assigned a serial number to permit giving the latest information.

Congestion notification is repeatedly issued until an ACK is received in a UI frame. The PSS PLCA cannot receive an ACK when the SGC confronts the PSS of CT2, and the ACK is sent again after a 1-second rejection.

FIG. 10 shows a format of a UI frame.

As a UI frame for the congestion notification is not checked for a serial number in the second layer, an ACK is checked in a UI ACK frame transmitted from the PSS-PLCA taking a message board into account. However, as a plurality of congestion messages in a plurality of DLCC interfaces are collected, and the performance of the PSS-PLCA should be taken into account, such events as a repetition of congestion release/detection/release, etc. may arise during the queuing of an UI frame or during the UI ACK process. Therefore, a UI frame is assigned a serial number to each event of congestion detection/release for a turnaround check.

Thus, the SGC waits for only a UI ACK frame of the latest event of each point.

Congestion in each point is detected for every counter increment, and release is made by a periodical scanning operation.

A timer is used for this periodical scanning operation, activated when congestion is detected in any point, and stopped when all points are released and an ACK of the UI frame is received.

A congestion counter is adopted to count the number of the above described congestion points. The congestion counter is incremented when congestion is detected in each point, and decremented when a UI ACK of congestion release is received. A timer is activated when the congestion counter reaches 1, and stopped when the counter reaches 0.

However, the congestion counter is not incremented when congestion is detected again while waiting for a UI ACK frame of congestion release. This is determined using a SUP flag provided in a P information monitor for indicating the process of waiting for a UI ACK of release after the congestion detection.

The processes involved in changing circuit ports are performed as follows:

The number of DLCC ports collected in a packet port is managed by an active counter. When an active counter indicates 0, the IOCS is stopped. The related congestion control information (by a flag, counter, etc.) of the P information monitor is explained as follows:

In principle, the packet port of the SGC is changed without blocking any of other ports, so the congestion counter is not reset. When information is discarded, the consistency is secured without the reset because it is a decrementing process.

On the other hand, a flag is not canceled for congestion control information, but transmission of a UI frame is stopped when the active counter indicates 0. In this case, if a congestion message indicates sending a message in progress (SUP flag=1), the congestion counter is decremented and a UI ACK waiting flag and a SUP flag are canceled.

Each of a DLCC port and a packet port, and Rx and Tx perform the above described processes on UI frames to be generated.

The above described explanation are related to the operation of the PKTCNTL of this invention.

FIG. 11 illustrates in detail the operation of the PKTCNTL.

The operation related to this invention is thus explained in detail, thus further information being skipped.

This invention enables a communication controller having only relay and concentration functions without a communication protocol to perform a congestion control. This invention secures a congestion control exclusively within a terminal and eliminates an undesirable influence on communications in relay units, thus realizing a highly reliable switching apparatus.

What is claimed is:

1. An ISDN D channel congestion control method for of an ISDN digital switching apparatus for controlling traffic congestion between terminals and the digital subscriber line circuit common, comprising:
   a step storing D channel packet information concentrated by a signaling controller in a first buffer;
   a step of transferring the D channel packet information stored in the first buffer to at least one of second buffers each corresponding to respective terminals in dependence upon distribution data;
   a step of detecting whether the used capacities of the second buffers exceed a threshold, when the terminals receive the D channel packet information through the corresponding one of the second buffers connected to the terminals;
   a step of discarding the D channel packet information for those of the second buffers whose used capacities exceed the threshold; and
   a step of notifying a packet linked controller access of said discarding through a simplified linked layer access procedure D channel protocol.

2. An ISDN D channel congestion control method for the digital subscriber line circuit common of an ISDN digital switching apparatus, comprising:
   a step of storing D channel signaling information concentrated by a signaling controller in a first buffer;
   a step of transferring the D channel signaling information stored in the first buffer to at least one of second buffers each corresponding to respective terminals in dependence upon distribution data;
   a step of detecting the signaling information for respective terminals in excess of a predetermined information volume and resetting the link, when the terminals receive the D channel signaling information through the corresponding one of the second buffers.

3. An ISDN D channel congestion control method for the digital subscriber line circuit common of an ISDN digital switching apparatus, comprising:
   a step of performing a congestion control according to the usage rate of a receiving buffer, when the receiving buffer stores D channel packet information concentrated by a signaling controller;
   a step of notifying a packet linked controller access in a packet subscriber system of a congestion by a simplified linked layer access procedure D channel protocol; and
   a step of regulating the D channel packet information by a linked layer access procedure D channel in the packet linked controller access.

4. An ISDN D channel congestion control method for a signaling controller of an ISDN digital switching apparatus, comprising:
   a step of monitoring the usage rate of a receiving buffer for receiving P (packet) information supplied from a digital subscriber line circuit common;
   a step of setting sixteen to (16) the service access point of a packet subscriber system when the usage rate is equal to or greater than a first usage rate threshold;
   a step of outputting a receive not ready signal to a terminal according to a linked layer access procedure D channel (LAPD); and
   a step of discarding the P (packet) information when the usage rate of the receiving buffer is equal to or greater than a second usage rate threshold.

5. An ISDN D channel congestion control method for the signaling controller of an ISDN digital switching apparatus having a digital subscriber line circuit common, comprising:
   a step of monitoring the usage rate of a sending buffer storing P (packet) information to be transmitted to the digital subscriber line circuit common;
   a step of performing a primary congestion notification when the usage rate of the sending buffer reaches a first usage rate threshold;
   a step of regulating the transmission of the I frame having a the digital subscriber line circuit common shelf number corresponding to a packet linked controller access in a packet subscriber system; and
   a step of performing a secondary congestion notification for discarding the packet information, when the usage rate of the sending buffer exceeds a second usage rate threshold.

6. An ISDN D channel congestion control method for the signaling controller of an ISDN digital switching apparatus having a digital subscriber line circuit common, comprising:
   a step of monitoring the usage rate of a buffer storing signaling information to be transmitted to the digital subscriber line circuit common;
   a step of regulating transmission from a line processor through a primary congestion notification, when the usage rate of the buffer is detected to be not less than a first usage rate threshold; and
   a step of compulsorily releasing the line processor through a secondary congestion notification, when the usage rate is detected to be greater than a second usage rate threshold.

7. An ISDN D channel congestion control method for a signaling controller of an ISDN digital switching apparatus, comprising:

a step of monitoring the usage rates of respective receiving buffers for concentrating D channel lines;

a step of regulating the transmission of I frames from the corresponding line of a packet linked controller access in a packet subscriber system through a primary congestion notification, when one of the usage rates reaches a first usage rate threshold; and a step of having the signaling controller discard the information to be stored in one of the receiving buffers through a secondary congestion notification, when the usage rate of the one of the receiving buffers reaches a second usage rate threshold.

8. An ISDN D channel congestion control method for a signaling controller of an ISDN digital switching apparatus, comprising:

a step of monitoring the usage rates of respective sending buffers for concentrating respective D channel lines;

a step of notifying a usage rate in excess of a first usage rate threshold to a packet link controller access in a packet subscriber system, thereby outputting a receive not ready signal by the linked layer access procedure D channels of all shelves concentrating the D channel lines;

a step of notifying a line processor of a usage rate in excess of a second usage rate threshold; and a step of having the signaling controller discard the excess D channel information.

9. An ISDN D channel congestion control method for a signaling controller of an ISDN digital switching apparatus, comprising:

a step of monitoring the usage rates of sending buffers for respective lines in a linked layer access procedure D channel of the signaling controller;

a step of outputting a primary congestion notification, and regulating calls destined for a line processor, when any one of the usage rates exceeds a first usage rate threshold; and a step of outputting a secondary congestion notification, and compulsorily releasing the sending buffers, when one of the usage rates exceeds a second usage rate threshold.

* * * * *